United States Patent
MacArthur et al.

(10) Patent No.: US 8,046,090 B2
(45) Date of Patent: Oct. 25, 2011

(54) APPARATUS AND METHOD FOR AUTOMATED CLOSED-LOOP IDENTIFICATION OF AN INDUSTRIAL PROCESS IN A PROCESS CONTROL SYSTEM

(75) Inventors: J. Ward MacArthur, Scottsdale, AZ (US); Charles Q. Zhan, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 348 days.

(21) Appl. No.: 11/700,557

(22) Filed: Jan. 31, 2007

(65) Prior Publication Data
US 2008/0183311 A1 Jul. 31, 2008

(51) Int. Cl.
*G05B 13/02* (2006.01)
(52) U.S. Cl. .......................................... 700/32
(58) Field of Classification Search .................. 700/28, 700/32, 33, 51, 29, 2, 513
See application file for complete search history.

(56) References Cited

U.S. PATENT DOCUMENTS
6,947,876 B1 9/2005 Galarza et al.
2004/0030667 A1 2/2004 Xu et al.

FOREIGN PATENT DOCUMENTS
WO WO 00/41042 A1 7/2000

OTHER PUBLICATIONS

Van Den Hof et al.; "Indentification and Control—Closed -loop Issues"; 1995; Automtica; vol. 31; No. 12 pp. 1751-1770.*
Keith Glover, "All optimal Hankel-norm approximations of linear multivariable systems and their $L^\infty$ -error bounds", International Journal of Control, 1984, vol. 39, No. 6, pp. 1115-1193.
D.E. Rivera, ChE 494/598, EEE 598 Intro to System Identification: Control-Relevant Identification, Apr. 16 and 18, 1998, 18 pages.
Yucai Zhu, "Process in MPC Identification: A Case Study on Totally Closed-Loop Plant Test", ERTC Computing, Milan , Italy, 11 pages.
Yucai Zhu, Multivariable Process Identification for MPC: The Asymptotic Method and its Applications, pp. 1-23.
Yucai Zhu,"Multivariable and Closed-Loop Identification for Model Predictive Control", pp. 1-19.

(Continued)

*Primary Examiner* — Albert Decady
*Assistant Examiner* — Chad Rapp
(74) *Attorney, Agent, or Firm* — Munck Carter, LLP

(57) ABSTRACT

An apparatus, method, and computer program are provided for automated closed-loop identification of an industrial process in a process control system. Multiple models (such as multiple model structure-model order combinations) can be identified, where the models are associated with a process to be controlled. One or more metrics (such as a prediction metric or rank) can be determined for each of the models. At least one of the models can be selected based on the one or more metrics. A final model for controlling the process can be provided (such as to a controller), where the final model is based on the at least one selected model. A band pass filter could be designed using some of the identified models. The band pass filter could be used to identify at least one other of the models or to determine at least one of the one or more metrics.

26 Claims, 12 Drawing Sheets

OTHER PUBLICATIONS

Wallace E. Larimore et al., "Automated System Identification: Basic Principles with Control and Monitoring Applications", American Control Conference 2004, Jun. 28, 2004, 2 pages.

Urban Forssell et al., "Closed-loop identification revisited", Automatica 35 (1999), pp. 1215-1241.

Daniel E. Rivera et al., "Experimental Design for Robust Process Control Using Schroeder-Phased Input Signals", Proceedings of the American Control Conference, San Francisco, California, Jun. 1993, pp. 895-899.

Sujit Gaikwad, "Control-Relevant Identification of Multivariate Systems in Chemical Process Industries", Sep. 1995, 54 pages.

Elena Grassi et al., "Integrated System Identification and PID Controller Tuning by Frequency Loop-Shaping", IEEE Transactions on Control Systems Technology, vol. 9, No. 2, Mar. 2001, pp. 285-294.

I. Gustavsson et al., "Survey Paper", Automatica, vol. 13, 1977, pp. 59-75.

Paul M. J. Van Den Hof et al., "Identification and Control-Closed-loop Issues", Automatica, vol. 31, No. 12, 1995, pp. 1751-1770.

Lennart Ljung et al., "Subspace identification from closed loop data", Signal Processing 52 (1996), pp. 209-215.

Brett Ninness et al., "Estimation of Model Quality", Automatica, vol. 31, No. 12, 1995, pp. 1771-1797.

Kostas Tsakalis et al., "Loop-Shaping Controller Design From Input-Output Data: Application to a Paper Machine Simulator", IEEE Transactions on Control Systems Technology, vol. 10, No. 1, Jan. 2002, pp. 127-136.

Peter Van Overschee et al., "N4SID: Subspace Algorithms for the Identification of Combined Deterministic-Stochastic Systems", Automatica, vol. 30, No. 1, 1994, pp. 75-93.

Seungrohk Oh et al., "Nonlinear Output-Feedback Tracking Using High-gain Observer and Variable Structure Control", Automatica, vol. 33, No. 10, 1997, pp. 1845-1856.

Yucai Zhu, "Multivariable System Identification for Process Control", 2001, 21 pages.

Wallace E. Larimore et al., "Automated Multivariable System Identification: Basic Principles with Control and Monitoring Applications", Presented at the Neural Net and Process Control Consortium, Sep. 23, 1999, 67 pages.

Lennart Ljung, "System Identification", 1987, 31 pages.

Sten Bay Jorgensen et al., "Recent Advances and Challenges in Process Identification", Proceedings Chemical Process Control VI, Jan. 2002, pp. 55-74.

Robert L. Kosut, "Uncertainty Model Unfalsification: A System Identification Paradigm Compatible with Robust Control Design", Proceedings of the 34th Conference on Decision & Control, New Orleans, LA, Dec. 1995, pp. 3492-3497.

Wallace E. Larimore, "Canonical Variate Analysis in Identification, Filtering, and Adaptive Control", Proceedings of the 29th Conference on Decision and Control, Honolulu, Hawaii, Dec. 1990, pp. 596-604.

Lennart Ljung, "Asymptotic Variance Expressions for Identified Black-Box Transfer Function Models", IEEE Transactions on Automatic Control, vol. AC-30, No. 9, Sep. 1985, pp. 834-844.

Weilu Lin et al., "A Framework for Closed-loop Subspace Identification with Innovation Estimation", Feb. 9, 2004, 39 pages.

Anders Dahlen at al., "Experimental Evidence Showing That Stochastic Subspace Identification Methods May Fail", Division of Optimization and Systems Theory, Royal Institute of Technology, Stockholm, Sweden, 1998, 12 pages.

C. T. Chou et al., Abstract of "Subspace Algorithms for the Identification of Multivariable Dynamic Errors-in-Variables Models", Automatica, Vol. 33, 1997, 2 pages.

Yucai Zhu, Abstract of "Black-box identification of MIMO transfer functions: Asymptotic properties of prediction error models", Int. J. Adptive Cont. Signal Processing, vol. 3, 1989, 1 page.

Phil Celaya et al., "Closed-Loop Identification at the Hovensa Refinery", 18 pages.

Dr. Ralph Lien et al., "How Much Can We Increase the Efficiency of MPC Identification?", 30 pages.

William P. Snow et al., "Increase MPC Project Efficiency by Using a Modern Identification Method", ERTC Computing, Paris, France, pp. 1-14.

* cited by examiner

APPARATUS AND METHOD FOR AUTOMATED CLOSED-LOOP IDENTIFICATION OF AN INDUSTRIAL PROCESS IN A PROCESS CONTROL SYSTEM

TECHNICAL FIELD

This disclosure relates generally to control systems and more specifically to an apparatus and method for automated closed-loop identification of an industrial process in a process control system.

BACKGROUND

Processing facilities are often managed using process control systems. Example processing facilities include manufacturing plants, chemical plants, crude oil refineries, ore processing plants, and paper or pulp manufacturing and processing plants. Among other operations, process control systems typically manage the use of motors, valves, and other industrial equipment in the processing facilities.

In conventional process control systems, controllers are often used to control the operation of the industrial equipment in the processing facilities. The controllers could, for example, monitor the operation of the industrial equipment, provide control signals to the industrial equipment, and generate alarms when malfunctions are detected.

Conventional controllers typically operate using models of the industrial processes being controlled. The models allow the controllers to determine, based on input signals from sensors or other data, how to control the industrial equipment. For long-term and successful control of an industrial process, it is often necessary to perform process identification and generate an accurate model of the process. The quality of the model can dramatically impact the performance of the controller that uses the model.

Process identification is often one of the most important aspects of any control project and can easily consume large amounts of project resources. However, identification may require direct interaction with the actual industrial process, and personnel are often less than enthusiastic about this aspect of a project. As such, it is common for controller performance to degrade over time since model enhancement is usually not performed after the initial model is generated. Various techniques have been developed for performing process identification, although each technique typically has various drawbacks or weaknesses.

SUMMARY

This disclosure provides an apparatus and method for automated closed-loop identification of an industrial process in a process control system.

In a first embodiment, a method includes identifying multiple model structure-model order combinations. The model structure-model order combinations are associated with a process to be controlled. The method also includes determining one or more metrics for each of the model structure-model order combinations. The method further includes selecting at least one of the model structure-model order combinations based on the one or more metrics. In addition, the method includes providing a model for controlling the process, where the model is based on at least one selected model structure-model order combination.

In particular embodiments, identifying the model structure-model order combinations includes generating multiple model sets. Each model set includes multiple models associated with a single model structure and having different model orders.

In other particular embodiments, the method further includes (i) estimating a time delay associated with the model prior to identifying the model structure-model order combinations, (ii) reducing an order of the model prior to providing the model for controlling the process, and/or (iii) reducing an order of one or more of the model structure-model order combinations prior to selecting the at least one model structure-model order combination.

In yet other particular embodiments, the method further includes designing a band pass filter using some of the model structure-model order combinations. Also, identifying the model structure-model order combinations includes identifying at least one of the model structure-model order combinations using the band pass filter. The model structure-model order combinations used to design the band pass filter could be validated.

In still other particular embodiments, the method further includes designing a band pass filter using at least some of the model structure-model order combinations. At least one of the one or more metrics, such as a prediction metric, is determined using the band pass filter.

In a second embodiment, an apparatus includes at least one memory operable to store multiple models associated with a process to be controlled. The apparatus also includes at least one processor operable to determine one or more metrics for each of the models, select at least one of the models based on the one or more metrics, and provide a final model for controlling the process. The final model is based on the at least one selected model.

In a third embodiment, a computer program is embodied on a computer readable medium and is operable to be executed by a processor. The computer program includes computer readable program code for identifying multiple models associated with a process to be controlled. The computer program also includes computer readable program code for determining one or more metrics for each of the models. The computer program further includes computer readable program code for selecting at least one of the models based on the one or more metrics. In addition, the computer program includes computer readable program code for providing a final model for controlling the process, the final model based on the at least one selected model.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
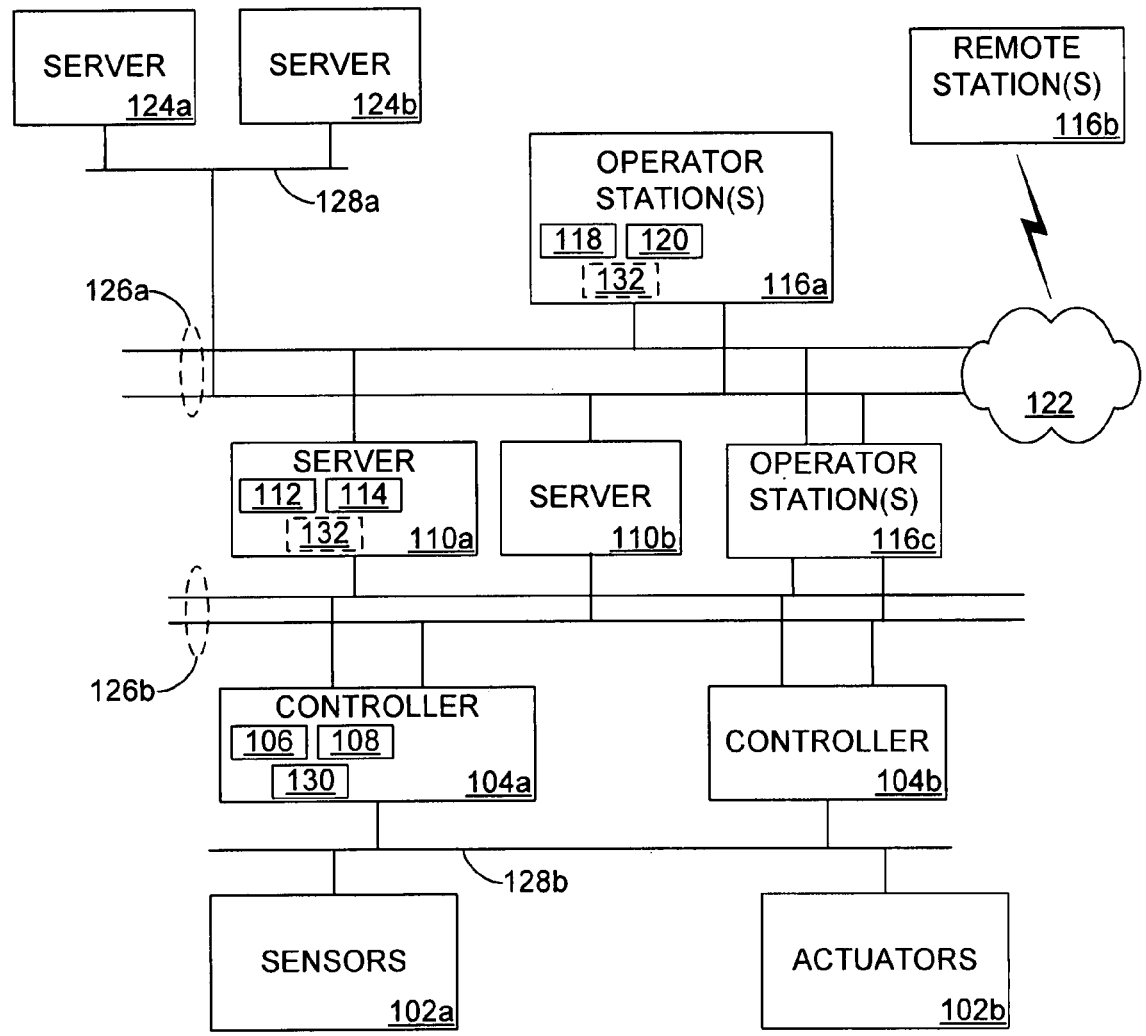
FIG. 1 illustrates an example process control system.

FIG. 1 illustrates an example process control system 100. The embodiment of the process control system 100 shown in FIG. 1 is for illustration only. Other embodiments of the process control system 100 may be used without departing from the scope of this disclosure.

In this example embodiment, the process control system 100 includes various process elements that facilitate the manufacture or processing of at least one material. The process control system 100 could represent any suitable system for producing or processing one or more materials, such as an oil and gas refinery or a pulp/paper system. These or other industries are often characterized by vastly different processes having different response characteristics that can range from sub-seconds (such as pressure driven hydraulic loops) to days (such as high purity distillation). Also, these or other industries typically have processes that are, in general, non-stationary because of drift and disturbances with broad power spectrum. In addition, these or other industries typically involve processes that suffer from unmeasurable disturbances and/or sensor/feedback noise.

In this example, the process elements include one or more sensors 102a and one or more actuators 102b. The sensors 102a and actuators 102b represent components in a process or production system that may perform any of a wide variety of functions. For example, the sensors 102a could measure a wide variety of characteristics in the process control system 100, such as temperature, pressure, or flow rate. As another example, the actuators 102b can perform a wide variety of operations that alter the characteristics being monitored by the sensors 102a. As particular examples, the actuators 102b could represent heaters, motors, catalytic crackers, or valves. The sensors 102a and actuators 102b could represent any other or additional components in any suitable process or production system. Each of the sensors 102a includes any suitable structure for measuring one or more characteristics in a process or production system. Each of the actuators 102b includes any suitable structure for operating on or affecting material in a process or production system.

Two controllers 104a-104b are coupled to the sensors 102a and actuators 102b. The controllers 104a-104b may, among other things, use the measurements from the sensors 102a to control the operation of the actuators 102b. For example, the controllers 104a-104b could be capable of receiving measurement data from the sensors 102a and using the measurement data to generate control signals for the actuators 102b. Each of the controllers 104a-104b includes any hardware, software, firmware, or combination thereof for interacting with the sensors 102a and controlling the actuators 102b. The controllers 104a-104b could, for example, represent multivariable predictive control (MPC) controllers or other types of controllers that implement control logic (such as logic associating sensor measurement data to actuator control signals) to operate. In this example, each of the controllers 104a-104b includes one or more processors 106 and one or more memories 108 storing data and instructions used or generated by the processor(s) 106. As a particular example, each of the controllers 104a-104b could represent a computing device running a MICROSOFT WINDOWS operating system.

Two servers 110a-110b are coupled to the controllers 104a-104b. The servers 110a-100b perform various functions to support the operation and control of the controllers 104a-104b, sensors 102a, and actuators 102b. For example, the servers 110a-110b could log information collected or generated by the sensors 102a or controllers 104a-104b, such as measurement data from the sensors 102a. The servers 110a-110b could also execute applications that control the operation of the controllers 104a-104b, thereby controlling the operation of the actuators 102b. In addition, the servers 110a-110b could provide secure access to the controllers 104a-104b. Each of the servers 110a-110b includes any hardware, software, firmware, or combination thereof for providing access to or control of the controllers 104a-104b. In this example, each of the servers 110a-110b includes one or more processors 112 and one or more memories 114 storing data and instructions used or generated by the processor(s) 112. As a particular example, each of the servers 110a-110b could represent a computing device running a MICROSOFT WINDOWS operating system.

One or more operator stations 116a-116b are coupled to the servers 110a-110b, and one or more operator stations 116c are coupled to the controllers 104a-104b. The operator stations 116a-116b represent computing or communication devices providing user access to the servers 110a-110b, which could then provide user access to the controllers 104a-104b (and possibly the sensors 102a and actuators 102b). The operator stations 116c represent computing or communication devices providing direct user access to the controllers 104a-104b. As particular examples, the operator stations 116a-116c could allow users to review the operational history of the sensors 102a and actuators 102b using information collected by the controllers 104a-104b and/or the servers 110a-110b. The operator stations 116a-116c could also allow the users to adjust the operation of the sensors 102a, actuators 102b, controllers 104a-104b, or servers 110a-110b. Each of the operator stations 116a-116c includes any hardware, software, firmware, or combination thereof for supporting user access and control of the system 100. In this example, each of the operator stations 116a-116c includes one or more processors 118 and one or more memories 120 storing data and instructions used or generated by the processor(s) 118. In particular embodiments, each of the operator stations 116a-116c could represent a computing device running a MICROSOFT WINDOWS operating system.

In this example, at least one of the operator stations 116b is remote from the servers 110a-110b. The remote station is coupled to the servers 110a-110b through a network 122. The network 122 facilitates communication between various components in the system 100. For example, the network 122 may communicate Internet Protocol (IP) packets, frame relay frames, Asynchronous Transfer Mode (ATM) cells, or other suitable information between network addresses. The network 122 may include one or more local area networks (LANs), metropolitan area networks (MANs), wide area networks (WANs), all or a portion of a global network such as the Internet, or any other communication system or systems at one or more locations.

In this example, the system 100 includes two additional servers 124a-124b. The servers 124a-124b execute various applications to control the overall operation of the system 100. For example, the system 100 could be used in a processing or production plant or other facility, and the servers 124a-124b could execute applications used to control the plant or other facility. As particular examples, the servers 124a-124b could execute applications such as enterprise resource planning (ERP), manufacturing execution system (MES), or any other or additional plant or process control applications. Each of the servers 124a-124b includes any hardware, software, firmware, or combination thereof for controlling the overall operation of the system 100.

As shown in FIG. 1, the system 100 includes various redundant networks 126a-126b and single networks 128a-128b that support communication between components in the system 100. Each of these networks 126a-126b, 128a-128b represents any suitable network or combination of networks facilitating communication between components in the system 100. The networks 128a-128b could, for example, represent redundant Ethernet networks, and the network 128a could represent a single Ethernet network. Also, the network 128b could represent a single Ethernet network, an electrical signal network (such as a HART or FOUNDATION FIELDBUS network), or a pneumatic control signal network.

In one aspect of operation, at least one of the controllers 104a-104b represents a multivariable predictive control (MPC), controller or other type of controller that operates using a model 130. The model 130 generally represents at least part of an industrial process being controlled, such as by defining how the controller controls one or more of the actuators 102b based on input data from the sensors 102a. The identification of the model 130 (which involves an identification of how the process being controlled behaves) is often critical to the proper operation of the controller. As a result, it is often desirable to generate a model 130 that accurately reflects the behaviors of the process being controlled when the controller is commissioned. Not only that, the process being controlled often varies or changes over time, meaning the model 130 generated during commissioning of the controller may not be as accurate as possible later. Because of this, it is often desirable to update the model 130 so that it continues to accurately reflect the behaviors of the process being controlled.

To facilitate the initial identification or updating of a model 130, a model identification tool 132 can be provided in the system 100. The model identification tool 132 analyzes data (such as historical data received from the sensors 102a and sent to the actuators 102b) to identify multiple models of the process to be controlled. The model identification tool 132 then analyzes the generated models and selects the model that best represents the process to be controlled. The model identification tool 132 can then make this model available to the controllers 104a-104b as the model 130. The model identification tool 132 includes any hardware, software, firmware, or combination thereof for identifying multiple models and selecting one or more of the models for use. The model identification tool 132 could, for example, represent one or more computer programs executed by the processor(s) in the servers 110a-110b or the operator stations 116a-116c.

In general, the model identification tool 132 may identify multiple types of model structures (such as a family of Prediction Error Model or "PEM" derived structures) and a family of model orders for each structure. These model structures and orders can be searched or analyzed to identify the most effective model (structure and order) for a particular application. As part of the identification of the most effective model, various metrics can be defined and calculated, and the best (such as the most effective or most accurate) model can be selected.

Depending on the environment and the implementation, the following functionality can be supported by the model identification tool 132. However, not all of the following functionality need be present in all implementations of the model identification tool 132. A subset of this functionality could be implemented in the model identification tool 132 depending on particular needs.

In some embodiments, the model identification tool 132 may use low frequency (gain) model information and unbiased models to select the best model. The focus on gain may be done for model optimization. If there is no need for optimization, bandwidth goals of the controller could be used to define the frequency band over which useful model information is required. The desire for unbiased models may result, in large part, from the operating behavior of a constraint-based controller. The desire for unbiased models may be less significant in a controller without constraints.

No single process identification method may be equally effective for all applications. While certain model structures may have a higher likelihood of being successful than others, these structures can fail in particular situations where others succeed. This can occur even when the model is not order-limited. The model identification tool 132 therefore may perform a search of a set or family of candidate model structures. The model structures contained in the set or family can be determined based on past performance and recent advances deemed to be of practical value. As such, individual model structures can be added or removed as more promising techniques become available.

Also, asymptotic theory may not in itself be sufficient for practical representation of model quality and/or existence. Consistency and bias considerations resulting from asymptotic theory can be useful or even essential for choosing candidate models. However, it may be less effective at providing model quality metrics in practical step testing that does not meet the assumptions imposed by asymptotic theory. The model identification tool 132 may therefore support a hybrid approach for representing model quality. This hybrid approach can combine asymptotic results in terms of confidence limits, along with observations based on model perturbations available from physical (possibly short length) data sets and statistical predictive performance metrics.

Further, the representation of models in the frequency domain, while promising, could have relatively little impact on conventional multivariable predictive control as practiced in certain industries. To be truly impactive, uncertainty descriptions can be mapped between model and controller, as is done in "control-relevant identification" techniques. Here, models may need to be accurate only over the frequency ranges that are relevant to the associated controller, and the frequency range of interest may be dictated by the bandwidth of the controller. Because of this, the model identification tool 132 may be capable of determining model quality primarily in a model's very low frequency (steady state) behavior. This may be useful, for example, in industries having a preference for constrained optimization rather than bandwidth performance.

Even when used with bandwidth-based controllers, control-relevant identification could be useful, and the model identification tool 132 may support various functions to support this. For example, the model identification tool 132 could support a loop-shaping approach for proportional-integral-derivative (PID) control that uses an uncertainty description in the frequency domain to define the acceptable bandwidth (loop shape) of the controller. Asymptotic-based uncertainty computations (in combination with heuristics) can also be done in a component-wise fashion, as in the context of additive or multiplicative uncertainty estimation. In addition, "unfalsification" concepts can be useful in state-space based loop-shaping designs.

Moreover, industrial processes are often non-stationary. Accurate representations of unmeasurable disturbances by colored noise models have been used in academic settings, but direct use of these models in practical controller design has been problematic. The model identification tool 132 can use noise models to deal with non-stationary data and band pass filtering to precondition the data.

Beyond that, standard evaluation methods, such as residual analysis and predictive performance through simulation, are used throughout the industrial control industry. Unfortunately, these tests can give very misleading results. Visual inspection methods, while popular in univariate open-loop step testing, can become problematic in multivariate and/or closed-loop testing. The model identification tool 132 therefore can use a statistically-based prediction metric that is relatively invariant to data filtering and scaling. This may allow, for example, the prediction metric to be used to compare models of different structures under varying conditions.

Furthermore, the effective use of filters to allow extra freedom in shaping the properties of prediction errors is well understood in academic settings. Proper use of filters can support frequency weighting, which can be done to emphasize frequency ranges that are more important than other ranges. With the possible exception of differencing operators, the use of filters has not been widely accepted in the industrial community. The model identification tool 132 may use band pass filters as an integral part of the search and evaluation of the models and the selection of the best model for a given process to be controlled.

In addition, it has been reasonable in the past to expect that personnel (such as practitioners of MPC applications) would be fully versed in basic model identification techniques. However, due to increasing demands in terms of control performance, user training, time, and resources, it may no longer be reasonable to assume that personnel can be skilled in the latest techniques. The model identification tool 132 may therefore support fully automated identification and selection of a model for a controller. At the same time, all sublevels of identification may be available for skilled personnel if desired.

Although FIG. 1 illustrates one example of a process control system 100, various changes may be made to FIG. 1. For example, a control system could include any number of sensors, actuators, controllers, servers, operator stations, networks, and model identification tools. Also, the makeup and arrangement of the process control system 100 is for illustration only. Components could be added, omitted, combined, or placed in any other suitable configuration according to particular needs. In addition, FIG. 1 illustrates one operational environment in which model identification can be used. The model identification mechanism could be used in any other suitable device or system.

Figure 2:
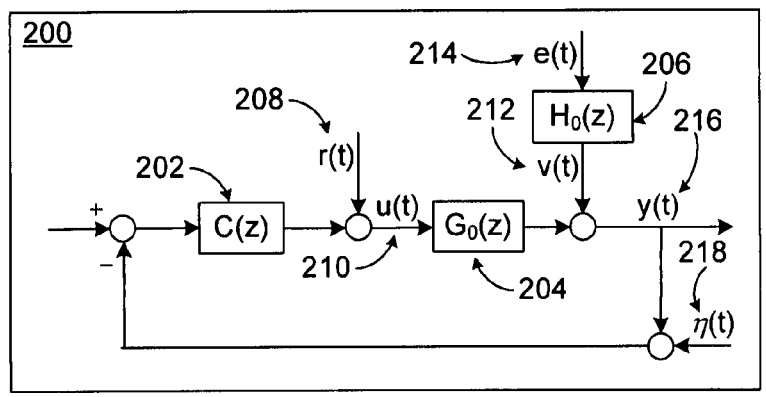
FIG. 2 illustrates an example representation of a process system.

FIG. 2 illustrates an example representation 200 of a process system. The embodiment of the process system representation 200 shown in FIG. 2 is for illustration only. Other process system representations could be used without departing from the scope of this disclosure. Also, for ease of explanation, the process system representation 200 is described as representing or being controlled by the process control system 100 of FIG. 1. The process system representation 200 could be associated with any other suitable system.

In the example shown in FIG. 2, all inputs and outputs are assumed to be multi-dimensional vectors. In this example, the logic implemented by a controller (such as controller 104a or 104b) is represented by a discrete controller representation 202. The discrete controller representation 202 could, for example, represent a non-linear or time-invariant controller. The process being controlled by the controller is represented by a process model 204. Noise is represented in the representation 200 by a discrete noise model 206, which could be linear and time-invariant.

A dither signal 208 (denoted r(t)) can be superimposed on one or more outputs of the controller at time t. The resulting signal 210 (denoted u(t)) represents the input to the process. Unmeasurable disturbances 212 (denoted v(t)) are based on white noise disturbances 214 (denoted e(t)) provided to the discrete noise model 206. An output signal 216 (denoted y(t)) represents the output of the process being controlled. Sensor noise disturbances 218 (denoted η(t)) are combined with actual sensor measurements of the output signal 216. The sensor measurements (as affected by sensor noise disturbances 218) are fed back to the controller, such as by subtracting the sensor measurements from a desired setpoint.

In general, closed-loop operation of the controller can impose additional complications relative to the open-loop case. Generally, in closed-loop operation, inputs are correlated to disturbances through feedback. Because of this correlation, methods that work well in the open-loop case may fail in the closed-loop case. The following description provides a practical technique for process identification that is valid for both open-loop and closed-loop systems.

Although FIG. 2 illustrates one example representation 200 of a process system, various changes could be made to FIG. 2. For example, a process system could be modeled in any other suitable manner.

Figure 3:
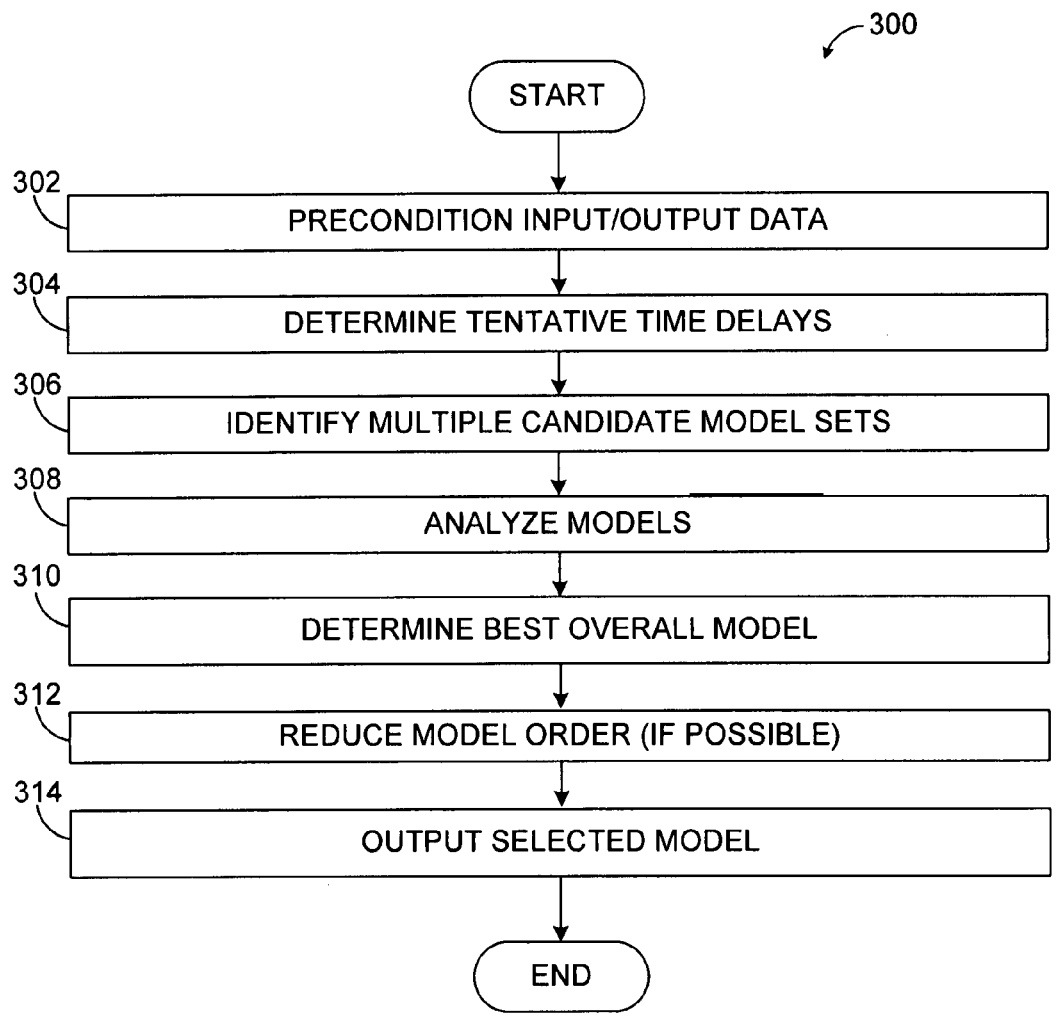
FIGS. 3 through 4B illustrate example methods for automated identification of an industrial process in a process control system.
Figure 4A:
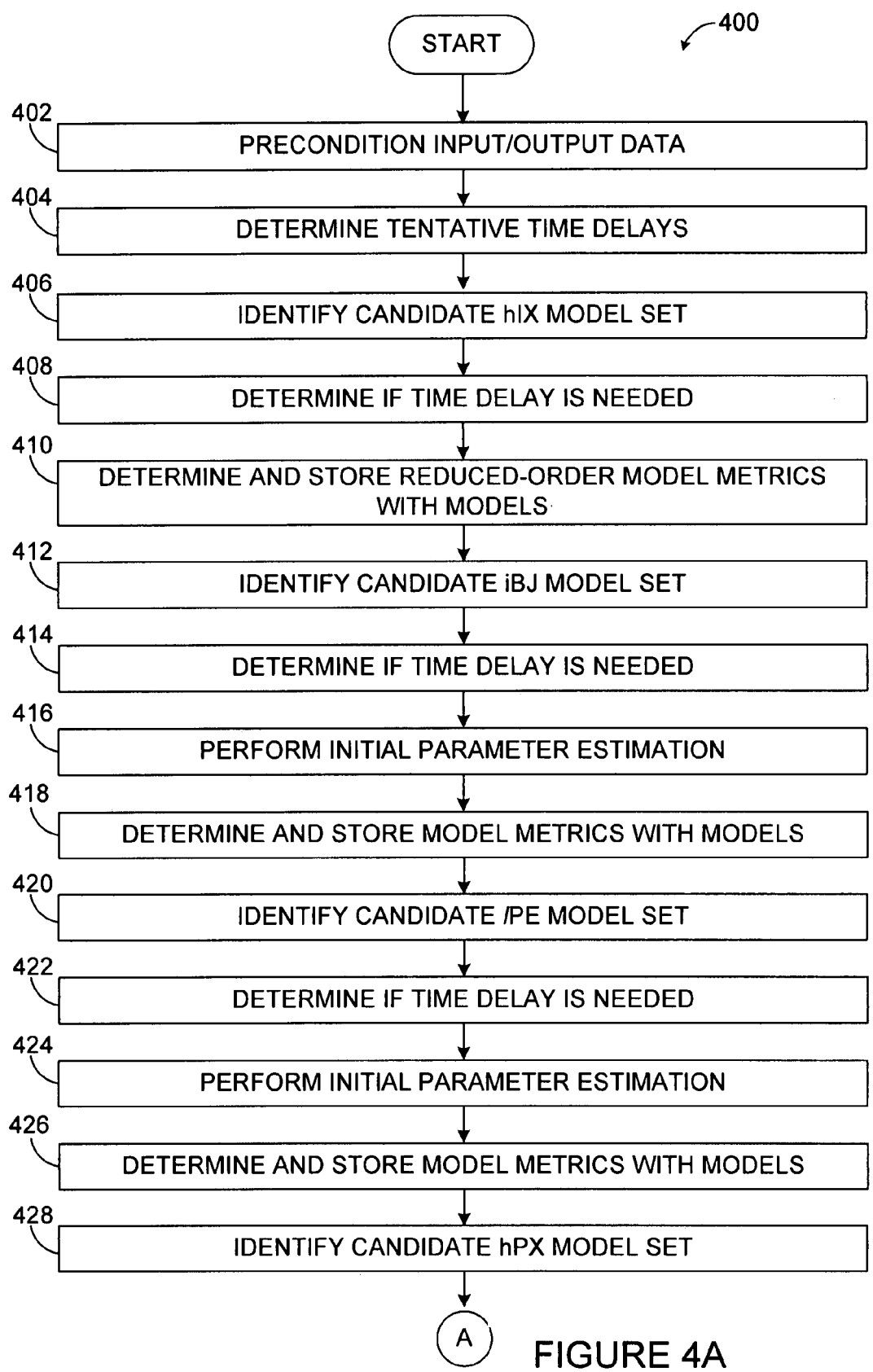
Figure 4B:
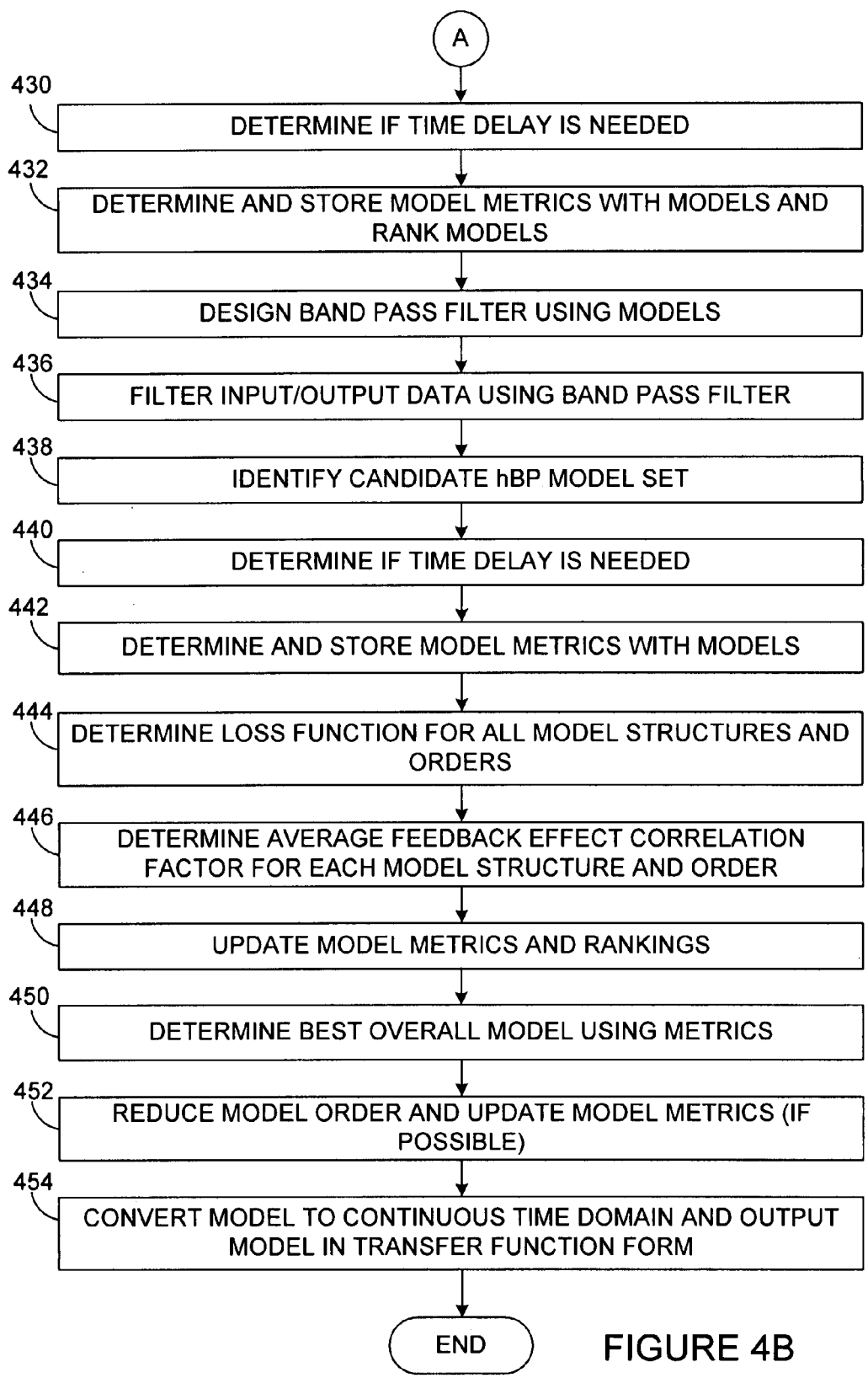

FIGS. 3 through 4B illustrate example methods for automated identification of an industrial process in a process control system. More specifically, FIG. 3 illustrates a more general method 300 for automated identification of an industrial process, while FIGS. 4A and 4B illustrate a more specific implementation of a method 400 for automated identification of an industrial process. The embodiments of the methods 300 and 400 shown in FIGS. 3 through 4B are for illustration only. Other embodiments of the methods could be used without departing from the scope of this disclosure. Also, for ease of explanation, the methods 300 and 400 may be described as being used by the model identification tool 132 in the system 100 of FIG. 1 to identify a process modeled using the representation 200 of FIG. 2. The methods 300 and 400 could be used by any suitable device or system to identify any suitable type of process to be controlled.

As shown in FIG. 3, input/output data to be used to identify a model for controlling a process is preconditioned at step 302. This could include, for example, the model identification tool 132 scaling the input/output data to an appropriate scale. This could also include the model identification tool 132 subtracting averages from discontinuous data segments.

Tentative time delays are determined for the range of expected model orders at step 304. In general, when there is a change to the input of a process, there is a corresponding change in the output of the process. The model to be used to control the process describes how the process output evolves over time corresponding to changes in the process input. Thus, the model can be used to predict process output changes based on process input changes. If a process output change occurs immediately when a process input change occurs, there is no delay. However, in many processes, an output change occurs some time after the input change occurs. This is described by the time delay in the model used to control the process. An accurate estimate of the time delay may be useful because it may help to reduce the order of the final model chosen to control the process or increase the accuracy or effectiveness of the model. An example technique for determining the tentative time delays is described below.

Multiple candidate sets of models are identified using the input/output data at step 306. Each model set could, for example, be associated with a different type of model. Also, each model set could include models of various orders, such as when each model set includes first-order, second-order, third-order, and fourth-order models. As an example, the model sets could include various models derived from the PEM paradigm, where both direct and joint input-output techniques are used. Multiple model structures (and subsequently multiple orders for each structure) establish a population of candidate models to analyze. Example types of models and techniques for generating the models are described below.

In particular embodiments, the identification of the candidate model sets may involve the following. The model identification tool 132 may calculate high-order model initial conditions (IC) for models requiring an iterative search. The model identification tool 132 may also estimate model parameters (both with and without the tentative time delays) and select parameters that result in a minimum loss function. At least some of the models being analyzed may be over-parameterized to satisfy the asymptotic theory and to provide sufficient structure, so model quality may be compromised due to the increased variance of higher-order models. To reduce or eliminate this problem, the model identification tool 132 may reduce the orders of the generated models prior to final analysis and selection. In addition, a band pass filter can be designed based on the generated model sets, and an additional model set can be generated using band pass-filtered data.

The candidate models are analyzed at step 308. This could include, for example, the model identification tool 132 determining various metrics for the previously generated candidate models in the various sets. The metrics may or may not be exclusively dependent on asymptotic theory. The metrics may allow an empirical based technique to give some indication as to the quality of the models, and the quality could identify the "goodness" (or lack thereof) of the models as well as the validity of the models. The metrics can be independent of predictive performance, and each input-output model pair can be ranked based on the quality metrics.

The best overall model is selected at step 310. The best overall model could be the model that most effectively or most accurately represents the process to be controlled. For example, the selection of the best overall model could involve a search designed to identify which model structure-model order combination yields the best overall performance. The best overall model could be selected based on the metrics determined during step 308. The best overall model could also be selected using a prediction metric, which may be based on an output error for each model generated via simulation. For instance, inputs and outputs for the simulation can be transformed by a band pass filter (whose breakpoints are defined by the candidate models). The filtered data can be used during the simulation to determine the prediction metric for each candidate model. The various metrics could then be combined and used to select the best overall model.

If possible, the order of the selected model is reduced at step 312. The selected model is then output at step 314. The model could be output in any suitable manner, such as in the form of a transfer function.

FIGS. 4A and 4B illustrate a more specific method 400 for automated identification of an industrial process. In FIG. 4A, input/output data is preconditioned at step 402, and tentative time delays are determined at step 404. This could occur in the same or similar manner as described above with respect to FIG. 3.

A high-order auto-regressive with integrated exogeneous inputs (hIX) candidate model set is identified at step 406. This could include, for example, the model identification tool 132 generating a set of hIX models having different model orders using the preconditioned input/output data. A determination is made as to whether a time delay is needed for the hIX models at step 408. The model orders can be reduced (if possible), and metrics associated with the hIX models are determined and stored along with the models at step 410. The metrics may, for example, provide an indication as to the quality of the different hIX models in this set of candidate models.

An intermediate Box-Jenkins (iBJ) candidate model set is identified at step 412. This could include, for example, the model identification tool 132 generating a set of iBJ models having different model orders using the preconditioned input/output data. A determination is made as to whether a time delay is needed for the iBJ models at step 414. Initial parameter estimation is performed for the iBJ models at step 416. This may involve the model identification tool 132 identifying initial conditions for the iBJ models. Metrics associated with the initialized models are determined and stored along with the models at step 418.

A low-order output error (lPE) candidate model set is identified at step 420. This could include, for example, the model identification tool 132 generating a set of lPE models having different model orders using the preconditioned input/output data. A determination is made as to whether a time delay is needed for the lPE models at step 422, and initial parameter estimation is performed at step 424. Metrics associated with the initialized lPE models are determined and stored along with the models at step 426.

A high-order pre-filtered auto-regressive with exogenous inputs (hPX) candidate model set is identified at step 428. This could include, for example, the model identification tool 132 generating a set of hPX models having different model orders using the preconditioned input/output data. A determination is made as to whether a time delay is needed for the hPX models at step 430, and metrics associated with the hPX models are determined and stored along with the models at step 432. At this point, the various models that have been generated can be given an initial ranking, such as a ranking based on the model quality metrics determined up to this point.

Using the current model sets, one or more band pass filters are designed at step 434. This may include, for example, the model identification tool 132 generating a band pass filter used in subsequent steps to identify an additional candidate model set and to determine a predictive metric for the models. The band pass filter is used to filter the input/output data at step 436.

A high-order, band pass filtered, auto-regressive with exogeneous inputs (hBP) candidate model set is identified at step 438. This could include, for example, the model identification tool 132 generating a set of hBP models having different model orders using the input/output data as filtered by the band pass filter. A determination is made as to whether a time delay is needed for the hBP models at step 440, and metrics associated with the hBP models are determined and stored along with the models at step 442.

At this point, the model identification tool 132 continues analyzing the candidate model sets in an attempt to identify the model that best represents the process to be controlled. For example, a loss function for each model structure-model order combination is determined at step 444. Also, an average feedback effect correlation factor can be identified for each model structure-model order combination at step 446. As explained in more detail below, the average feedback effect correlation factor may represent a prediction error associated with each model structure-model order combination. The model metrics and rankings can then be updated using the loss function and average feedback effect correlation factor information at step 448.

The best overall model is then selected using the metrics and rankings at step 450. This may include, for example, the model identification tool 132 identifying the model structure and order having the highest ranking with the lowest prediction error. The order of the selected model is reduced (if possible) at step 452, and the model metrics are updated if the model order is reduced. The model is then output at step 454, such as by converting the model to the continuous time domain and outputting the model in transfer function form. The transfer function models may then be converted to state-space models using, for example, balanced realization techniques. Transforming the models at this stage allows for direct control of the bias-variance distribution. This feature is not possible in direct state-space identification.

Additional details regarding various ones of these steps (such as the identification of the models or the determination of the metrics) are provided below in conjunction with FIGS. 5 through 24.

Although FIGS. 3 through 4B illustrate examples of methods for automated identification of an industrial process in a process control system, various changes may be made to FIGS. 3 through 4B. For example, while each figure illustrates a series of steps, various steps in these figures could overlap, occur in parallel, or occur in a different order. As a particular example, certain calculations may not be strictly sequential, and the results of prior calculations could be used to precondition future calculations.

FIGS. 5 through 24 illustrate example operations during automated identification of an industrial process in a process control system. In particular, FIGS. 5 through 24 and the accompanying description illustrate and describe various operations that may occur during the methods 300 and 400 of FIGS. 3, 4A, and 4B. The example operations shown in FIGS. 5 through 24 are for illustration and explanation only. Other or additional operations could occur during automated identification of an industrial process without departing from the scope of this disclosure.

Model Structures

Introduction:

As noted above, the model identification tool 132 may generate multiple candidate sets of models. The types of candidate model sets generated in a particular implementation may vary depending on a variety of factors, such as practical constraints imposed during step testing in normal operation of the process system. For example, safety and operating constraints often impose limitations on how a process system can be tested. In a typical plant, it may not be possible to build a single monolithic multiple input, multiple output (MIMO) model. This may be the case irrespective of the identification procedure to be used for model building. Often times, only a portion of the process corresponding to a given controller can be stepped or tested during a given period of time. Models for a final controller can be typically generated by combining multiple groups or blocks of smaller MIMO sub-models. In some cases, disjoint data may require a data transformation-based deconvolution of known models from alternate data sets. It is also often important to realize that there may be no causal relationship between input/output data channels. In fact, model matrices often have a large number of empty or null values (such as 50% to 80%). If the null relationships are known beforehand, this information can be used to greatly enhance the performance of the model identification tool 132.

In general, a generic PEM model structure can be defined as:

$$y(t)=G(z,\theta)u(t)+H(z,\theta)e(t). \quad (1)$$

Here, $\theta$ is a vector of unknown parameters, e is a zero-mean white noise sequence with variance $\lambda$, y is a p-dimensional vector of outputs, and u is a q-dimensional vector of inputs. Consequently, G is dimensioned pxq, and H is dimensioned pxp. For the purposes of analysis, it is assumed that data is generated from a true system as defined by:

$$\mathcal{L}: y(t)=G_0(z)u(t)+H_0(z)e(t). \quad (2)$$

The true system is denoted by $\mathcal{L}$. Here, let the available data be denoted by:

$$D^N=[y(1),u(1),\ldots,\ldots,y(N),u(N)] \quad (3)$$

where N is the number of data records. Also, let the allowable model structure be denoted as:

$$\mathcal{M}:\{G(z,\theta),H(z,\theta)|\theta\in\Theta\} \quad (4)$$

where $\Theta$ is the allowable range of permissible parameter values. Thus, in some embodiments, the model identification tool 132 determines whether the true system defined by Equation (2) belongs to the set given in Equation (4).

To do this, define the set $S(\mathcal{L},\mathcal{M})$ as those $\theta$ values in $\Theta$ for which $\mathcal{L}=\mathcal{M}(\theta)$. This set is empty when $\mathcal{L}\notin\mathcal{M}$. If it is assumed that $\mathcal{L}\in M$ so that $\mathcal{L}=\mathcal{M}(\theta_0)$ for some value $\theta_0$ and that $\mathcal{M}$ is globally identifiable at $\theta_0$, then:

$$S(\mathcal{L},\mathcal{M})=\{\theta_0\}. \quad (5)$$

A good model choice is to select $\mathcal{M}$ such that Equation (5) holds. Since $\mathcal{L}$ is an abstraction and may never be known, this may require tests of several different structures. This search of model structures (as well as model order) may represent the basic search described above that is performed by the model identification tool 132.

In the PEM identification approach, the estimate of the unknown parameter on the data set can be defined by:

$$\hat{\theta}_N = \hat{\theta}_N(D^N) = \underset{\theta\in\Theta}{\arg\min} V_N(\theta, D^N). \quad (6)$$

Here, "arg min" means "the minimizing argument of the function." The function can be defined by the following norm:

$$V_N(\theta, D^N) = \frac{1}{N}\sum_{t=1}^{N}\mathcal{J}(\varepsilon_f(t,\theta)) \quad (7)$$

where $\mathcal{J}(\circ)$ is a scalar-valued function. Both quadratic and robust norms can be supported here. The filtered prediction error $\varepsilon_f(t,\theta)$ in Equation (7) can be given by the following expression:

$$\varepsilon_f(t,\theta)=L(z)\varepsilon(t,\theta) \quad (8)$$

where:

$$\varepsilon(t,\theta)=y(t)-\hat{y}(t|t-1,\theta)=\hat{H}^{-1}[y(t)-\hat{G}u(t)]. \quad (9)$$

The gradient of the prediction error can be defined as:

$$\psi(t,\theta) = -\frac{d}{d\theta}\varepsilon(t,\theta) = \frac{d}{d\theta}\hat{y}(t|t-1,\theta). \quad (10)$$

In Equations (8) and (9), L(z) represents a stable linear filter, and the symbols $\hat{G}$ and $\hat{H}$ are used to denote $G(z,\hat{\theta}_N)$ and $H(z,\hat{\theta}_N)$, respectively. Similarly, the symbols $G_\theta$ and $H_\theta$ can be used to denote $G(z,\theta)$ and $H(z,\theta)$, respectively. While the filter $L(z)$ is shown explicitly in Equation (8) to denote its effect on shaping the prediction error, it may also be used as a data pre-filter and as an additional term in the noise model for a specific candidate model set (the hBP model set).

Asymptotic Results:

In the following description, these variables are used for notational convenience:

$$T(z, \theta) = [G(z, \theta)\ H(z, \theta)] \text{ and } \chi(t) = \begin{bmatrix} u(t) \\ e(t) \end{bmatrix} \quad (11)$$

where T is dimensioned $px(q+p)$, and $\chi$ is dimensioned $(q+p) \times 1$. With this definition, Equation (1) can be rewritten as:

$$y(t) = T(z,\theta)\chi(t). \quad (12)$$

From Equation (11), the power spectrum of $\chi(t)$ can be denoted:

$$\Phi_\chi(\omega) = \begin{bmatrix} \Phi_u(\omega) & \Phi_{ue}(\omega) \\ \Phi_{eu}(\omega) & \lambda \end{bmatrix} \quad (13)$$

where $\Phi_u(\omega)$ and $\Phi_{ue}(\omega)$ represent the power spectrum of u and the cross-power spectrum of u and e, respectively. Also, $\Phi_\chi$ is dimensioned $(q+p) \times (q+p)$. The following assumptions can be made here: Equation (6) converges to a unique global optimum for all n and N, all signals in $D^N$ are quasi-stationary, the scalar norm in Equation (7) is quadratic ($l(\circ) = \|\circ\|_2^2$), and $\Phi_\chi(\omega) > 0\ \forall\omega$.

From here, it follows that:

$$V_N(\theta, D^N) \to \bar{V}(\theta), \text{ and} \quad (14)$$

$$\hat{\theta}_N \to \bar{\theta}\ w.p.\ 1 \text{ as } N \to \infty \quad (15)$$

where:

$$\bar{V}(\theta) = \frac{1}{2}\bar{E}\{\varepsilon^2(t,\theta)\}, \text{ and} \quad (16)$$

$$\bar{\theta} = \underset{\theta \in \Theta}{\text{argmin}} \bar{V}(\theta). \quad (17)$$

Equation (17) can be rewritten as:

$$\bar{\theta} = \underset{\theta \in \Theta}{\text{argmin}} \frac{1}{2\pi} \int_{-\pi}^{\pi} tr(\Phi_\varepsilon) d\omega \quad (18)$$

where $\Phi_\varepsilon(\omega)$ is the power spectrum of $\omega$. By combining Equations (2), (9), (11), and (12), the prediction error can be rewritten as:

$$\varepsilon(t) = H_\theta^{-1}\tilde{T}\chi(t) + e(t) \quad (19)$$

where:

$$\tilde{T} = [G_0 - G_\theta\ H_0 - H_\theta] \quad (20)$$

and where $e(t)$ is independent of $[G_0-G_\theta]u(t)$ and of $[H_0-H_\theta]e(t)$ (since all terms are proper). As a result, the power spectrum of $\varepsilon$ can be written as:

$$\Phi_\varepsilon = H_\theta^{-1}\tilde{T}\Phi_\chi \tilde{T}^* H_\theta^{-1*} + \lambda \quad (21)$$

where:

$$\tilde{T}\Phi_\chi \tilde{T}^* = [G_0 - G_\theta\ H_0 - H_\theta]\begin{bmatrix} \Phi_u(\omega) & \Phi_{ue}(\omega) \\ \Phi_{eu}(\omega) & \lambda \end{bmatrix}\begin{bmatrix} G_0^* - G_\theta^* \\ H_0^* - H_\theta^* \end{bmatrix} \quad (22)$$

and, for example, $G^*_\theta = G^T(\theta, e^{-i\omega})$. Therefore:

$$\bar{\theta} = \underset{\theta \in \Theta}{\text{argmin}} \frac{1}{2\pi} \int_{-\pi}^{\pi} tr\{\tilde{T}\Phi_\chi \tilde{T}_*^T H_\theta^{-1*} H_\theta^{-1}\} d\omega. \quad (23)$$

With the use of Equation (22), the expression in Equation (23) illustrates the significant properties of the PEM approach under closed-loop conditions.

When $\mathcal{L} \in \mathcal{M}$, $G_0 \in \mathcal{M}$ and $H_0 \in \mathcal{M}$. As a result, the true plant and noise processes both lie inside the parameterized model sets. For this case, it is clear from Equation (22) that the minimum of Equation (23) occurs when $G_{\bar{\theta}} = G_0$ and $H_{\bar{\theta}} = H_0$. Hence, Equation (5) is satisfied. This leads to the following results, where estimation is consistent and unbiased:

$$\hat{\theta}_N \to \theta_0\ w.p.\ 1 \text{ as } N \to \infty \quad (24)$$

$$\hat{G} \to G_0;\ \hat{H} \to H_0\ w.p.\ 1 \text{ as } N \to \infty \quad (25)$$

$$G(e^{i\omega}, \hat{\theta}_N) \to G_0(e^{i\omega});$$

$$H(e^{i\omega}, \hat{\theta}_N) \to H_0(e^{i\omega})\ w.p.\ 1 \text{ as } N \to \infty \quad (26)$$

When $\mathcal{L} \notin M$, the plant and noise processes do not both lie inside the parameterized model sets. In these cases, it may be more desirable to have a good estimate of the plant process than the noise filter. For this case, consider G and H to be independently parameterized, and $G_0 \in \mathcal{M}$ and $H_0 \notin \mathcal{M}$. Here, the true plant process lies inside the parameterized model sets, but the noise process does not. This may be the case if there is no noise representation (such as in the lPE model set) or even if the noise is under-modeled. For this case, it is clear from Equations (22) and (23) that, in general, $G_{\bar{\theta}} = G_0$ does not result in a minimum of the objective function, so $\hat{G}$ does not converge to $G_0$. However, if open-loop testing is done, the minimum of Equation (23) may occur when $\Phi_{ue} \equiv 0$. This may lead to the following results when $G_0 \in \mathcal{M}$. Under closed-loop conditions, the estimation is biased, and $\hat{G}$ does not converge to $G_0$. Under open-loop conditions, $\Phi_{ue} \equiv 0$, and the estimate is consistent and unbiased:

$$\hat{\theta} \to \Theta_0\ w.p.\ 1 \text{ as } N \to \infty \quad (27)$$

$$\hat{G} \to G_0\ w.p.\ 1 \text{ as } N \to \infty \quad (28)$$

$$G(e^{i\omega}, \hat{\theta}_N) \to G_0(e^{i\omega})\ w.p.\ 1 \text{ as } N \to \infty. \quad (29)$$

When $G_0 \notin \mathcal{M}$, the estimation may always be biased irrespective of the noise model. This may be true under both open-loop and closed-loop operation, which may lead to the following results when $G_0 \notin \mathcal{M}$: estimation is always biased, and $\hat{G}$ does not converge to $G_0$.

In addition to $\hat{\theta}_N$ and $\hat{G}$, it may be useful to evaluate the model sets' properties in terms of $\hat{T}_N(e^{i\omega})=T(e^{i\omega},\hat{\theta}_N)$, which may have the following form:

$$\hat{T}_N(\omega) = \begin{bmatrix} \hat{G}_{1,1}(\omega) & \cdots & \hat{G}_{1,q}(\omega) & \hat{H}_{1,1}(\omega) & \cdots & \hat{H}_{1,p}(\omega) \\ \vdots & \ddots & \vdots & \vdots & \ddots & \vdots \\ \hat{G}_{p,1}(\omega) & \cdots & \hat{G}_{p,q}(\omega) & \hat{H}_{p,1}(\omega) & \cdots & \hat{H}_{p,p}(\omega) \end{bmatrix}. \quad (30)$$

The column vector $T^{\wp}(e^{i\omega})$ can be written as:

$$T^{\wp}(e^{i\omega}) = \wp \hat{T}_N(e^{i\omega}) \quad (31)$$

$$T^{\wp}(e^{i\omega}) = \begin{bmatrix} G_{1,1}(e^{i\omega},\hat{\theta}_N) \\ G_{2,1}(e^{i\omega},\hat{\theta}_N) \\ \vdots \\ G_{1,2}(e^{i\omega},\hat{\theta}_N) \\ \vdots \\ G_{p,q}(e^{i\omega},\hat{\theta}_N) \\ \vdots \\ H_{p,p}(e^{i\omega},\hat{\theta}_N) \end{bmatrix}$$

where $\wp$ is the column vector operator that creates a vector by stacking columns of a matrix one on top of the other. Based on Equations (11) and (12), the covariance of $\hat{T}_N(e^{i\omega})$ can be written as:

$$\text{cov}T^{\wp}(e^{i\omega}) = \frac{n}{N}\Phi_{\chi}^{-T}(\omega) \otimes \Phi_v(\omega) \quad (32)$$

where $\wp$, $\otimes$ are the column vector operator and Kronecker product, respectively, and the spectrum $\Phi_\chi(\omega)$ is given in Equation (13). Furthermore, $\text{cov}T^{\wp}$ has the dimensions $p(q+p)\times p(q+p)$ and is defined as $\Phi_v=H_0\lambda H^*_0$. The covariance can therefore be written as:

$$\lim_{n\to\infty}\frac{1}{n}P_n(\omega) \approx \begin{bmatrix} \Phi_u(\omega) & \Phi_{ue}(\omega) \\ \Phi_{eu}(\omega) & \lambda \end{bmatrix}^{-T} \otimes \Phi_v(\omega). \quad (33)$$

This leads to the following results on the asymptotic distribution of the estimates. When $\mathcal{L}\in\mathcal{M}$, variances of the $(i,j)^{th}$ model and filter, respectively, can be defined by:

var $[\hat{G}_{i,j}(e^{i\omega})]\approx\text{cov}T^{\wp}(k,k)$ where: $k=i+p(j-1); i=1\to p; j=1\to q$ (34)

and var $[\hat{H}_{i,j}(e^{i\omega})]\approx\text{cov}T^{\wp}(k,k)$ where: $k=pq+i+p(j-1); i=1\to p; j=1\to p$ (35)

Also, distributions of the estimates can be defined by:

$\sqrt{N}\hat{G}_{i,j}(e^{i\omega}) \to \mathcal{N}(0,P_n(\omega)_{k,k})$ (36)

where: $k=i+p(j-1); i=1\to p; j=1\to q$ and $\sqrt{N}\hat{H}_{i,j}(e^{i\omega}) \to \mathcal{N}(0,P_n(\omega)_{k,k})$ where: $k=pq+i+p(j-1); i=1\to p; j=1\to p$ (37)

where the covariance matrix is defined in Equation (33). In addition, the distribution of the estimates in the time domain can be given by:

$$\sqrt{N}(\hat{\theta}_N^i - \theta_0^i) \in \mathcal{N}(0, \hat{P}_{\hat{\theta}}(i,i)) \quad (38)$$

where: $i = 1 \to \dim(\hat{\theta}_N)$ $$\hat{P}_{\hat{\theta}} = \hat{\lambda}_N \left[\frac{1}{N}\sum_{t=1}^{N}\psi(t,\hat{\theta}_N)\psi^T(t,\hat{\theta}_N)\right]^{-1}$$

$$\hat{\lambda}_N = \frac{1}{N}\sum_{t=1}^{N}\varepsilon^2(t,\hat{\theta}_N)$$

and the gradient $\psi$ is defined in Equation (10).

Candidate Model Sets:

With this in mind, the various candidate model sets described below can be identified and analyzed by the model identification tool 132. In general, consistency and lack of bias may be important requirements for candidate models. Even though these are theoretical properties, they can provide a sound starting point for practical models. As shown above, $G_0\in\mathcal{M}$ (where G and H are independently parameterized) may be a requirement for open-loop operation, and $\mathcal{L}\in\mathcal{M}$ may be a requirement for closed-loop operation. As such, it may be useful if $\mathcal{M}$ includes the most probable candidates. The candidate model set $\mathcal{M}$ can therefore be described as follows:

$$\mathcal{M}=\{\mathcal{M}(O),\mathcal{M}_2(O),\ldots,\mathcal{M}(O)\} \quad (39)$$

where each set $\mathcal{M}_i$ contains a subset or family of model orders O:

$$O=\{n_1,n_2,n_3\}. \quad (40)$$

In particular embodiments, six sets of independent model structures $\mathcal{M}$ are considered by the model identification tool 132, and each model structure contains a set O of three independent orders. The orders in each set may vary for each model structure (meaning $\mathcal{M}(O_1)=n_1\neq\mathcal{M}(O_1)$).

Basic model structures for $G(z,\theta)$ and $H(z,\theta)$ can be defined using the following general parameterizations:

$$G(z,\theta) = \frac{B(z,\theta)}{A(z,\theta)F(z,\theta)}; \quad (41)$$

$$H(z,\theta) = \frac{1}{L(z)}\frac{C(z,\theta)}{A(z,\theta)D(z,\theta)}.$$

In this expression, the shaping filter L(z) has been included explicitly as it is fundamental in the definition of one specific model structure (the hBP model set). This parameterization is extremely flexible and may cover virtually all of the polynomial black-box models. The following nomenclature is used to describe the six model sets:

$\mathcal{M}$=hIX  $\mathcal{M}_4$=hPX $\mathcal{M}_2$=iBJ  $\mathcal{M}_5$=hBP.

$\mathcal{M}_3$=IPE  $\mathcal{M}_6$=tSP (42)

Before describing the six selected model structures in more detail, note that closed-loop operation imposes challenges that may not be present in open-loop operation due to cross-correlation between output error and inputs due to feedback. Because of this, closed-loop model identification methods can be classified into three broad categories. In the "direct" approach, issues with feedback are ignored, and model estimation is done using unaltered input/output signals. With this approach, unbiased estimates may require L∈M. In the "indirect" approach, the closed-loop transfer function between an external dither signal and the process output is first determined, and an open-loop model is determined from it using prior knowledge of the controller. In the "joint input/output" approach, measurements of both the inputs and outputs are used to identify a joint system, which has the process inputs and outputs as its outputs and the external dither signal as its input. The joint system can then be identified with only open-loop restrictions, so unbiased estimates may only require $G_0 \in \mathcal{M}$.

In some embodiments, indirect methods are not used to generate the candidate model sets considered by the model identification tool 132 due to the requirement that the controller representation be known and linear. In these embodiments, both direct and joint input/output methods can be used by the model identification tool 132 to define candidate model sets.

Parameterizations for the direct candidate models are described by Equation (41), and all of the models could be derived from these basic structures (whether direct or joint input/output). To describe the joint input/output models, it may be convenient to write the closed-loop transfer function for the block diagram shown in FIG. 2 as follows:

$$\begin{bmatrix} y(t) \\ u(t) \end{bmatrix} = \begin{bmatrix} (I+G_0C)^{-1}G_0 & (I+G_0C)^{-1}H_0 & -G_0C(I+G_0C)^{-1} \\ (I+CG_0)^{-1} & -C(I+G_0C)^{-1}H_0 & -C(I+G_0C)^{-1} \end{bmatrix} \begin{bmatrix} r(t) \\ e(t) \\ \eta(t) \end{bmatrix}. \quad (43)$$

Here, it has been assumed that the controller is linear, although the model identification tool 132 need not have this restriction. If the output and input sensitivity functions and the output complementary sensitivity function are defined as $S_o \equiv [I+G_0C]^{-1}$, $S_i \equiv [I+CG_0]^{-1}$ and $T_o \equiv G_0C[I+G_0C]^{-1}$, respectively, then Equation (43) can be rewritten as:

$$\begin{bmatrix} y(t) \\ u(t) \end{bmatrix} = \begin{bmatrix} S_oG_0 & S_oH_0 & -T_o \\ S_i & -CS_oH_0 & -CS_o \end{bmatrix} \begin{bmatrix} r(t) \\ e(t) \\ \eta(t) \end{bmatrix}. \quad (44)$$

From this closed-loop expression, it can be seen that the input is composed of three terms (one due to r, one due to e, and one due to η). Therefore, u can be expressed as:

$$u(t) = u^r(t) + u^e(t) + u^\eta(t) \quad (45)$$

where:

$$u^r(t) = S_i r(t)$$

$$u^e(t) = -CS_o H_0 e(t).$$

$$u^{\eta(t)} = -CS_o \eta(t) \quad (46)$$

In this form, $u^r$ represents the portion of the input u generated by the dither signal r, $u^e$ represents the portion due to process noise feedback, and $u^\eta$ represents the portion due to sensor noise feedback. With this representation, the process output can be written as:

$$y(t) = G_0 u^r(t) + G_0 u^e(t) + G_0 u^\eta(t) + H_0 e(t) \quad (47)$$

Since $u^r$ is uncorrelated with the remaining terms on the right hand side of Equation (47), a consistent estimate of $G_0$ can be obtained with data for y and $u^r$. In other words, the joint input/output methods may seek to first determine $u^r$ and, with this information, use standard direct methods for model estimation.

Also, before describing the six selected model structures, note that $\Phi_u$ can be written as:

$$\Phi_u = S_i \Phi_r S^*_i + CS_o H_0 \lambda H^*_0 S^*_o C^*$$

$$+ S_o H_0 \Phi_\eta H^*_0 S^*_o \quad (48)$$

where $\Phi_{ue}$, $\Phi_{eu}$, $\Phi_{u\eta}$, and $\Phi_{\eta u}$ can be defined as:

$$\Phi_{ue} = -CS_o H_0 \lambda$$

$$\Phi_{eu} = -\lambda H^*_0 S^*_o C^*$$

$$\Phi_{u\eta} = -CS_o \Phi_\eta$$

$$\Phi_{\eta u} = -\Phi_\eta S^*_o C^* \quad (49)$$

With the following definitions;

$$\Phi_u^r \equiv S_i \Phi_r S^*_i$$

$$\Phi_u^e \equiv CS_o H_0 \lambda H^*_0 S^*_o C^*$$

$$\Phi_u^\eta \equiv CS_o \Phi_\eta S^*_o C^* \quad (50)$$

Equation (48) can be written as:

$$\Phi_u = \Phi_u^r + \Phi_u^e + \Phi_u^\eta. \quad (51)$$

Therefore, $\Phi_u$ can be expressed as a sum of three components: $\Phi_u^r$ representing the portion from external dithering, $\Phi_u^e$ representing the portion from noise feedback, and $\Phi_u^\eta$ representing the portion due to sensor noise feedback. In addition, $\Phi_\chi$ can be written as:

$$\Phi_\chi = \begin{bmatrix} I & \Phi_{ue}\lambda^{-1} & \Phi_{u\eta}\Phi_\eta^{-1} \\ 0 & I & 0 \end{bmatrix} \begin{bmatrix} \Phi_u^r & 0 & 0 \\ 0 & \lambda & 0 \\ 0 & 0 & \Phi_u^\eta \end{bmatrix} \cdot \begin{bmatrix} I & 0 \\ \lambda^{-1}\Phi_{eu} & I \\ \Phi_\eta^{-1}\Phi_{\eta u} & 0 \end{bmatrix} \quad (52)$$

The preceding expression leads to the following result: in a linear controller C, $\Phi_u^r > 0 \forall \omega$ for the results noted above to hold. Therefore, an external dither signal may be required for closed-loop operation under these conditions. If the controller is nonlinear or time varying, $\Phi_\chi$ may be positive definite even without a dither signal. Even if $\Phi_\chi$ is positive definite, the model may be rendered useless due to variance errors as there is no mechanism in $\Phi_\chi$ to attenuate $\Phi_v$. A final observation can be made with respect to closed-loop operation for low bandwidth controllers. Under these conditions, the sensitivity function and the controller may have the following characteristics:

$$\lim_{\omega \to \infty} |S_o| = 1, \qquad (53)$$

$$\lim_{\omega \to \infty} |S_i| = 1 \text{ and } \lim_{\omega \to \infty} |C| = 0.$$

For a low bandwidth controller, $\omega_c \gg \omega^*$ (where $|S(\omega^*)| \approx 1$ and where $\omega_c$, is the cutoff frequency of the controller), so $|S_o| \approx |S_i| \approx 1 \gg |C|$. With this information, $\Phi_\chi$ can be rewritten as:

$$\Phi_\chi = \begin{bmatrix} \Phi_r & 0 \\ 0 & \lambda \end{bmatrix}. \qquad (54)$$

As a result, tests run in the closed loop may exhibit open-loop behavior for low bandwidth controllers. In this case, the model variance can be expressed as:

$$\text{var}[\hat{G}_{i,j}(e^{i\omega})] \approx \frac{n}{N} \frac{\Phi_v(i)}{\Phi_r(j,j)}. \qquad (55)$$

The same statement can be made if $|\Phi_v| \ll |\Phi_r|$. Because of this, at least one model set that is consistent only under open-loop conditions is included in $\mathcal{M}$.

Base Level Parameterization:

In the following description, no assumption is made as to the nature of the controller, and the controller can be either linear or nonlinear. A general MIMO structure may be assumed in some of the discussions in this patent document, and the polynomials of Equation (41) may be required to be polynomial matrices of the proper order. In addition, the polynomial structure may need to be specified for identifiability conditions. Since this could lead to cumbersome canonical forms and any advantage of a full MIMO structure may be obviated by the requirements of practical step testing, the methods considered here involve solving a sequence of p multiple input, single output (MISO) models, which are represented as:

$$y_j(t) = \sum_{i=1}^{q} [G_i^j(z, \theta(n))u_i(t) + H^j(z, \theta(n))e_j(t). \qquad (56)$$

Of the possible structures covered by Equation (41), one approach could be based on a subset of the models that have delivered the best overall performance based on historical performance. For example, one structure (ARX) can be used as a primitive element in several of these models. As such, the ARX structure may not be used alone but in conjunction with other structures. The ARX structure can be defined for the $j^{th}$ output as follows:

$$G_i^j(z, \theta(n)) = z^{-n_k(i,j)} \frac{B_i^j(z, \theta(n))}{A^j(z, \theta(n))} \qquad (57)$$

$$H^j(z, \theta(n)) = \frac{1}{L^j(z)A^j(z, \theta(n))}$$

where $n_k(i,j)$ is the tentative transport delay in sample intervals for the $i^{th}$ input and the $j^{th}$ output, n is the polynomial order, and L is a filter that depends on the specific structure with which the ARX structure is being used. The polynomials for a given structure and for a given candidate set could have the same order n. Unless otherwise noted, if there is no transport delay, the B polynomials allow for semi-proper structure.

Since the process being identified may be represented as a "black box" model in this ARX formulation, it is natural to let the model order n depend on the number of data samples n=n(N). Typically, to have a model set such that $G_0 \in \mathcal{M}$ and $H_0 \in \mathcal{M}$ for an industrial process, the order n needs to increase as the number of data samples N increases, but n could be small compared to N. Hence, an order requirement can be stated as:

$$n(N) \to \infty \text{ as } N \to \infty; n^2(N)/N \to 0 \text{ as } N \to \infty \qquad (58)$$

With this representation, the ARX order set $O^{ARX}$ can be specified as:

$$O^{ARX} = \{\tilde{n}, \tilde{n} + \delta_n, \tilde{n} + 2\delta_n\}$$

$$\tilde{n} = \max(\sqrt{N/10}, 30)$$

$$\delta_n = \tilde{n}/6 \qquad (59)$$

A mechanism can be provided for cases where there are one or more input/output channels with integrating behavior. In these instances, the output data can be differenced, as are all inputs corresponding to non-integrating input channels. When the solutions are complete, an exact zero in the z domain $(1-z^{-1})$ can be convolved with the appropriate sub-models. Several models sets are derived from this base-level parameterization.

Final Model Set $\mathcal{M}$:

In the various candidate model sets, the models may all involve numerically robust rank revealing factorizations. Iterative solutions may be supported by the MATLAB ID Toolbox, with the exception of initialization. While the "instrumental-variable method" can be used in the MATLAB ID toolbox it may be problematic under various practical applications. To correct this, the hIX method described below can be used, and a model reduction step can be implemented to form the initial estimates. When used for initial condition estimation, the orders for the hIX models can be determined using Akaike's Information theoretic Criterion (AIC) instead of Equation (59).

As described previously, in some embodiments, the model identification tool 132 operates to obtain unbiased models that require $\mathcal{L} \in \mathcal{M}$ under various restrictions (such as model convergence to a global minimum and quasi-stationary signals). The model sets chosen and described here may represent the models best suited to meet this goal under both open-loop and closed-loop operation. However, other or additional types of models could be used. A detailed description of each of the candidate model sets is presented below. In presenting any results based on predictive performance, the predicted value $\hat{y}$ can be based on open-loop X-step ahead prediction (meaning $\hat{y} = \hat{y}(t|t-\infty) = \hat{G}u(t)$), rather than on the one-step ahead prediction ŷ(t|t−1) used to define the prediction error as shown in Equation (9).

hIX Model Set:

A high-order auto-regressive with integrated exogeneous inputs (hIX) candidate model set can be determined using the direct method. This candidate model set may represent a high-order model set derived from Equation (59). Filter L can be used to remove non-stationary effects when required, and a global minimum for the loss function can be guaranteed as no iteration is required for the solution of Equation (6). This model structure could use the order set defined in Equation (59). For each order, two models can be created, one with L=1 and another with L=1−Z$^{-1}$. The latter is sometimes referred to as "differencing the data" or a velocity form. For the differencing filter to be effective, it may be used in conjunction with a high-order model. Use with low-order or under-parameterized models might be problematic and render the results useless. In addition, the use of a differencing filter in conjunction with noise models might not be considered if this would render useless models even for high-order applications.

Figure 5:
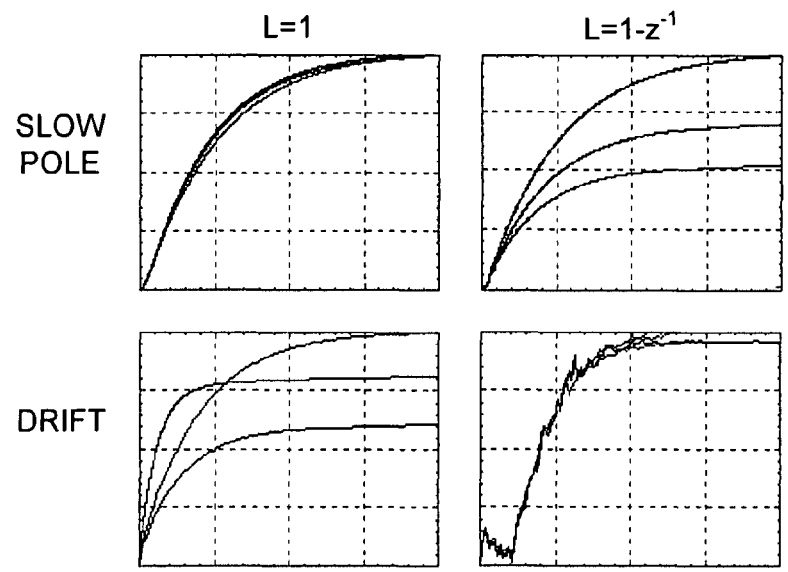
FIGS. 5 through 24 illustrate example operations during automated identification of an industrial process in a process control system.

In the hIX set, models with and without filtered data can be compared by measuring the variance of the individual sub-model step responses. An example comparison is shown in FIG. 5, which illustrates different classes of data (data with a slow pole and with drift) and with and without a filter (L=1 and L=1−z$^{-1}$). The shaded areas in FIG. 5 represent the variability of each model with different orders. This variability may be independent of the absolute gain or response time as the variability is calculated in normalized coordinates. The model identification tool 132 may operate so as to identify the filter that results in the lowest overall variability.

In FIG. 5, it can be seen that the variability of the displayed input channel with no filter (L=1) is best for the slow pole application, while the use of a filter (L=1−z$^{-1}$) is required for the case of non-stationary data. This is an example only and may not be uniformly true. This method can be extremely effective in automatically determining if a filter is required, and it may be independent of prediction error and insensitive to large variations in responses for various input channels. The model set with the lowest overall variability may be returned as the hIX solution.

iBJ Model Set:

An intermediate-order multi-input model with a Box-Jenkins structure (iBJ) can be determined using the direct method. This structure may require a non-convex iterative solution, meaning a global minimum might not be guaranteed. When the global minimum is obtained and the noise distribution is Gaussian, the estimates are unbiased and have minimum variance, so this may be an optimal estimator. Non-stationary effects can be accommodated directly by the noise model. With this (and other iterative solutions), the initial conditions can be calculated based on the initial hIX solution. An example standard parameterization used for this model is:

$$G_i^j(z, \theta(n)) = z^{-n_k(i,j)} \frac{B_i^j(z, \theta(n))}{F_i^j(z, \theta(n))}. \quad (60)$$

$$H^j(z, \theta(n)) = \frac{C^j(z, \theta(n))}{D^j(z, \theta(n))}$$

This model structure may use an intermediate order set defined as $O^{iBJ}=\{3,4,5\}$. When this structure is run against a non-stationary test data set, the non-stationary data can be taken care of directly by the disturbance model. Here, the real root of D may take the place of the differencing filter described previously, so no pre-filtering may be required here.

IPE Model Set:

A low-order multi-input model with output error structure (IPE) can be determined using the direct method. This structure may require a non-convex iterative solution, so a global minimum might not be guaranteed. However, due to its relatively simple structure, convergence might be more likely than with the iBJ structure. This is one model type that may be biased in closed-loop operation. There might be no inherent mechanism to deal with non-stationary data. Rather, this model type could be included solely due to its robust performance in open-loop operation and for closed-loop cases with low bandwidth control. The standard parameterization used for this model can be given by:

$$G_i^j(z, \theta(n)) = z^{-n_k(i,j)} \frac{B_i^j(z, \theta(n))}{F_i^j(z, \theta(n))}. \quad (61)$$

$$H^j(z, \theta(n)) = 1$$

Figure 6:
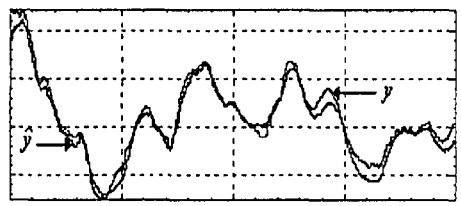

This model structure may use the low order set defined as $O^{IPE}=\{1,2,3\}$. This model structure may be useful, for example, when equipment being controlled has a very long response time and no dither signal is used. In this situation, the design of the band pass filter may fail due to the long response time, so other types of models (such as hBP and tSP model structures) may be inappropriate. In this case, the iBJ method may also fail, and the simpler IPE model may be significantly better than all other structures. In fact, it is possible that the equipment has response times (settling times) that are extremely long (such as one or more days) and are therefore never truly in equilibrium. Since there is no known model in this case, the predictive performance of the model (an example of which is shown in FIG. 6) could be used to ascertain the model quality visually.

hPX Model Set:

A high-order pre-filtered auto-regressive with exogenous inputs (hPX) model structure can be determined using the joint input/output method. This model structure could represent a high order multi-input three stage model. Each stage may be sequential with the estimates being refined in a boot strap fashion. The first stage of the hPX model structure may operate to solve Equation (57) with no filter L using standard ARX order sets from Equation (59). Therefore, a conventional ARX solution for the $j^{th}$ output can be obtained that results in the high-order estimates $\hat{G}_i^j$ and $\hat{H}^j$. Only proper models may be obtained with this structure.

The second stage of the hPX model structure may remove cross correlations between inputs and disturbances, thereby estimating $u^r$. This allows for a direct solution of Equation (47). Here, it is assumed that $u^n$ is small, so $u^r$ can be determined from Equation (45) once $u^e$ is known. The first step in this stage could involve computing the following open-loop or output prediction error:

$$\tilde{\varepsilon}_j = y_j - \hat{y}_j = y_j - \sum_{i=1}^{q} [\hat{G}_i^j u_i]. \quad (62)$$

A 40$^{th}$-order autoregressive (AR) filter W can be designed and used to whiten the output prediction error so that $\tilde{\varepsilon}_j^w$=W $\tilde{\epsilon}_j$. With the filtered prediction error available, the following estimation problem can be posed:

$$u_i(t) = T_i^{ue} \tilde{\epsilon}_j^w(t) + T_i^{ue} e(t). \tag{63}$$

Equation (63) can be solved for $\hat{T}^{ue}$ and $\hat{T}^{ue}$ using the ARX form given by Equation (57). This solution could use a fixed $40^{th}$-order single input, single output (SISO) parameterization. With this information, $u^e$ can be estimated by:

$$\hat{u}_i^e(t) = \hat{T}_i^{ue} \tilde{\epsilon}_j^w(t), t=1 \to N; i=1 \to q. \tag{64}$$

From Equation (45), with $u^\eta \ll \hat{u}^e$, $u^r$ can be given by:

$$u_i^r = u_i - \hat{u}_i^e. \tag{65}$$

Figure 7:
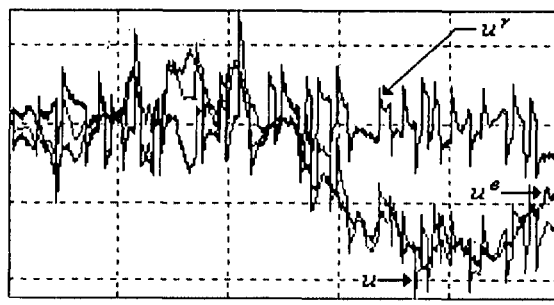

A high bandwidth PID control test data set can be used to show the effectiveness of this technique for removing feedback. FIG. 7 shows an original input u with $u^e$ and $u^r$ as calculated using Equations (62) through (65). The controller in this example transfers the variation in y due to a time varying disturbance to the controller output u. While the variation in u is due to both the disturbance and the dither signal, the swing shown by $u^e$ is due to the disturbance. The residual signal $u^r$ is due solely to the dither signal and can be used with the original y as data sets for direct identification.

The third stage of the hPX model structure may use the results of the first and second stages in conjunction with the IPE model structure to calculate q SISO models. The data for these q SISO models can be obtained by using the results from Equation (65) and the first stage results as a filter to obtain:

$$u_i^f = \hat{A}^j u_i^r; \tag{66}$$

$$y_i^f = \frac{\hat{B}_i^j}{\hat{A}^j} u_i^f.$$

There are q data sets $D_i^N = [y_i^f, u_i^f]$, and the IPE model structure (Equation (61)) can be used to calculate q SISO models. The hPX order set can be $O^{hPX} = \{2,3,4\}$.

Figure 8:
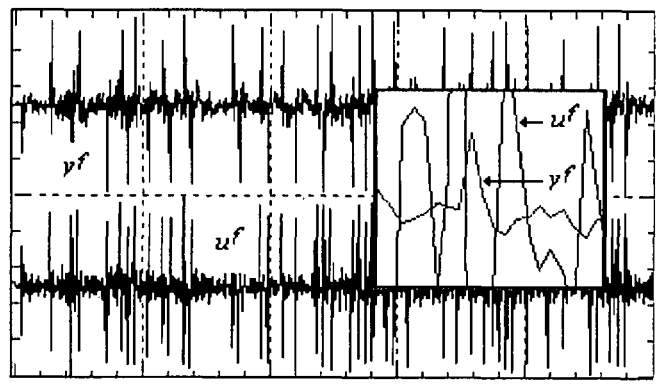
Figure 9:

While the second stage may be useful for removing feedback effects, it may incur little or no penalty in open-loop or low bandwidth applications. Not as apparent is the importance of the filter step in stage three. FIG. 8 shows these results, where filtered values for the original u and y data are illustrated along with an insert showing a small section of superimposed data. Using $\hat{A}^j$ to obtain $u_i^f$ may effectively weight the important frequency bands for a subsequent IPE pass. Here, it can be seen that the slower frequencies have been removed, and so no external filtering is required to deal with non-stationary data. As this filtered data is disturbance-free, the IPE pass for the SISO model could be relatively convergent. Nonetheless, local minima may be obtained in some cases. To reduce or minimize this possibility, two addition models of order $O_i^{hPX}+1$ and order $O_i^{hPX}-1$ can be built, and the model with the response closest to the average may be selected.

hBP Model Set:

A high-order, band pass filtered, auto-regressive with exogeneous inputs (hBP) model structure can be determined using the joint input/output method. This model structure may be identified using a preconditioning band pass filter. In the hIX technique described previously, a simple filter L is used since there was no prior process information available. In this technique, the filter L can be designed as a band pass filter based on results available from the modeling techniques described above (the hIX, iBJ, IPE, and hPX model structures). This technique can also use three stages. The first stage may use a band pass filter whose break points are defined based on current model information to precondition the input/output data. The efficacy of an example filter is illustrated in FIG. 9 for use with a non-stationary data test set. Band pass filtered values of y and u are shown as $\tilde{y}$ and $\tilde{u}$, respectively. This figure shows that both high noise and low drift frequencies can be effectively attenuated before any model identification is performed with an appropriate pre-filter.

The second stage of the hBP model structure may use the band pass filtered values $\tilde{y}$ and $\tilde{u}$ to solve Equation (57) with no filter L using standard ARX order sets from Equation (59). As a result, a conventional ARX solution for the $j^{th}$ output can be obtained that results in the high order estimates $\hat{G}_i^j$ and $\hat{H}^j$. Only proper models may be obtained with this structure.

The third stage of the hBP model structure may be similar or identical to the third stage of the hPX model structure described above, except here the order set may be $O^{hBP} = \{3, 4, 5\}$. An alternative embodiment of the third stage could be used, such as one where feedback effects are removed via the second stage in the hPX model structure followed by an auto-regressive moving average with exogenous variable (ARMAX) solution.

tSP Model Set:

A high-order, three stage projection (tSP) model structure can be determined using the joint input/output method. This model structure can represent a high-order multi-input three stage model. Like the hPX model, the tSP model may utilize an explicit step to remove feedback effects from the data. Unlike in the hPX technique, a MIMO non-causal impulse filter can be used in conjunction with explicit use of the dither signals to remove cross correlations between inputs and disturbances. In the first stage, a projection filter can be used to remove feedback from the data and hence estimate $\hat{u}^r$ prior to any modeling steps. Equations (63) and (64) can be used in the hPX technique to estimate $u^e$ in a sequential SISO fashion, while here a MIMO counterpart to Equation (63) can be used that includes the dither signal directly. This representation can be given by the following expression:

$$u(t) = T^{ur} r(t) + T^{ue} e(t). \tag{67}$$

In this way, there may be a dither signal for all q input channels. Also, $T^{ur}$ may be constrained to be a non-causal operator by parameterizing it as a two-sided impulse filter of the following form:

$$T^{ur}(z, \theta) = \sum_{i=-n_1}^{n_2} \theta_i z^{-i}. \tag{68}$$

Figure 10:
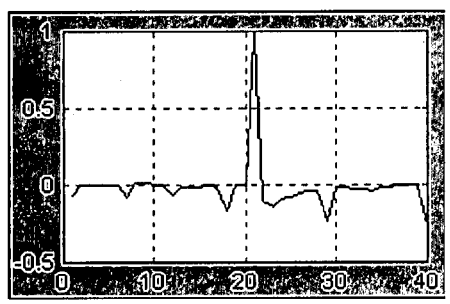

The structure in Equation (68) can be used to ensure that the resulting estimate $\hat{u}^r$ is uncorrelated asymptotically with $u - \hat{u}^r$, which becomes a residual in the subsequent identification step. In particular embodiments, the filter orders can be $n_1 = n_2 = 20$. The response of this filter to a high bandwidth PID control test data set is shown in FIG. 10. With $\hat{T}^{ur}$ known from Equation (68), $u^r$ can be directly estimated from:

$$\hat{u}_i^r(t) = \hat{T}^{ur} r_i(t), t=1 \to N; i=1 \to q. \tag{69}$$

Figure 11:
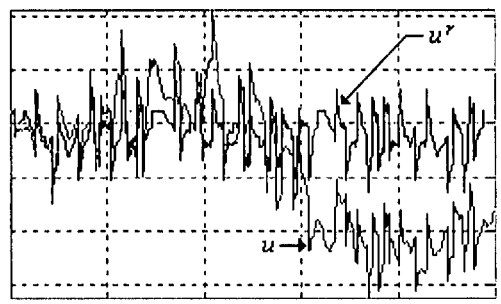

FIG. 11 shows the original input u and $u^r$ as calculated using Equation (69). As shown in FIG. 11, the start of $u^r$ is shifted by $n_1$, while the end is shortened by $n_2$ due to the non-causal filter. The signal $u^r$ is due solely to the dither signal and can be used with the original y as data sets for direct identification.

The second stage of the tSP model structure may be similar or identical to the first stage of the hPX model structure. This stage solves Equation (57) with no filter L using standard ARX order sets from Equation (59). As a result, a conventional ARX solution for the $j^{th}$ output may be obtained that results in the high-order estimates $\hat{G}_l^j$ and $\hat{H}^j$. Only proper models may be obtained with this structure.

The third stage of the tSP model structure may be similar or identical to the third stage of the hPX method and solve Equation (66). The tSP order set may be $O^{tSP}=\{2,3,4\}$.

Time Delay Estimation

As noted above, the methods 300 and 400 may involve estimation of the time delays for the models. Time delay can lead to seriously degraded model identification results if not explicitly addressed. For example, if delay is not explicitly accounted for, the likelihood of $G_0 \notin M$ increases significantly and can result in highly biased models.

Conventional techniques for estimating time delay often suffer from various drawbacks. For example, in many practical applications, there is no well defined minimum in the AIC, so there is no discernable "knee" in the singular values of the process. Real process disturbances and non-linear effects can render methods based solely on AIC or confidence bounds problematic. Also, the solution for delay is often a function of the applied model structure, meaning the delay that is best for one model structure may not be the best for a model with an alternate structure/order. Model order reduction with fixed delay can result in bias for the reduced model that was not present in the original model. In addition, the direct use of delays estimated external to the identification step can result in degraded performance. Since it is usually computationally prohibitive to estimate the model and the delay simultaneously in the multivariable case, prior estimated delays can be considered only as tentative values in the identification step. In SISO model order reductions, the delay/order combination can be determined jointly.

In some embodiments, the model identification tool 132 determines the delay estimates at two levels. Prior to model identification, tentative values for MISO multivariable time delays can be estimated (which may occur during steps 304 and 404 shown in FIGS. 3 and 4A). During model order reduction, SISO time delays can be determined in conjunction with the model reduction (which may occur during steps 312 and 452 shown in FIGS. 3 and 4B). The following describes the procedure used for multivariable delay estimation, while SISO delay estimation is described below in conjunction with order reduction.

For multivariable delay estimation, MISO impulse and ARX structures can be used. Direct estimation of delay based on statistical information of individual coefficients can be problematic in many applications. To circumvent this type of problem, a trend analysis can be performed by the model identification tool 132. In the trend-based approach, rather than looking at individual coefficients, the models can be used to construct response segments. These segments may then be used to detect what portions of the response are distinguishable from perceived noise. The design goal may be, for example, to detect delays up to three hours. Eight sets of model orders can be considered for each input channel, and sample rates less than one minute may require sub-sampling. The compression rate, which is used in the delay estimation routine, may be a function of the sample rate.

Figure 12:
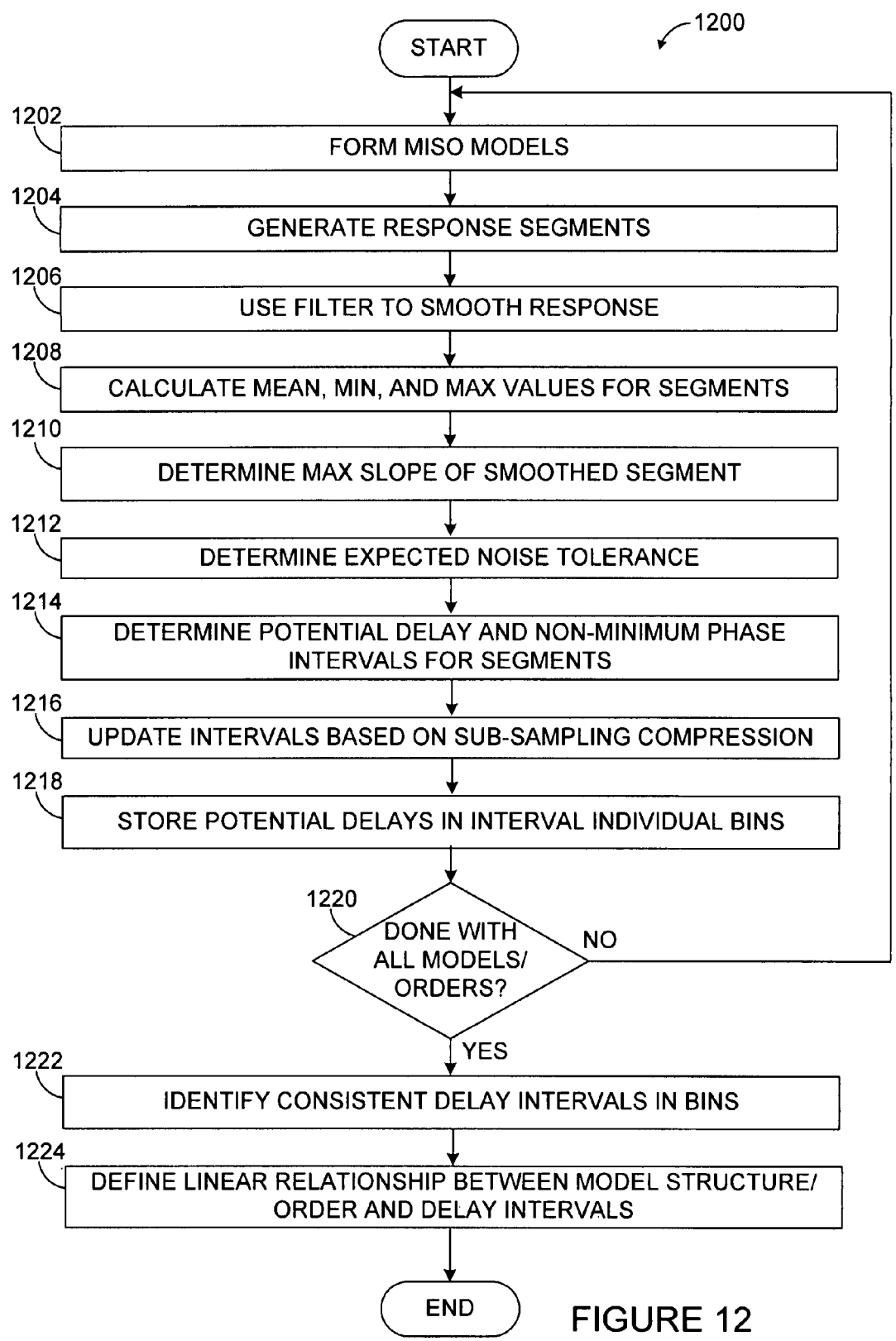

An example method 1200 for estimating the delay is shown in FIG. 12. In FIG. 12, steps 1202-1218 are used to estimate the delay for a single model order. A set of MISO models are generated at step 1202. Response segments are then generated using the MISO models at step 1204. The generated response segments are smoothed using a filter at step 1206, such as by using a forward-backward non-causal filter to smooth the response segments with no phase distortion. Mean, minimum, and maximum values for each smoothed and unsmoothed segment are determined at step 1208, and these values can be used later for noise tolerance evaluation. The maximum slope value of each smoothed segment is determined at step 1210, such as by using a moving average representation. The expected noise tolerance is determined at step 1212. The potential delay and non-minimum phase intervals for the smoothed and unsmoothed segments are determined at step 1214, such as by using forward-backward calculations and the noise tolerance. If necessary, the potential non-minimum phase intervals are updated based on sub-sampling compression at step 1216. Finally, the potential delay intervals are stored in individual interval bins at step 1218.

Steps 1202-1218 can be repeated if a determination is made at step 1220 that not all model structures and orders have been analyzed. When completed, a binned cumulative distribution is used to find consistent delay intervals at step 1222. If any consistent intervals exist, a linear functional relationship between model structure/order and delay intervals is defined at step 1224.

While heuristic approaches might generally be avoided here, they could be developed using historical plant test data and may render this trend analysis quite effective. Nevertheless, due to the "brute force" approach, it can be very time consuming. If model identification is performed during step testing, this is usually not a problem. However, in a desktop analysis mode, users may wish to be able to configure the delay estimation due to this computational burden. Because of this, user options may be provided for this aspect of the model identification (making the process less than fully automated). The approach described above could be the default approach used by the model identification tool 132. However, the user may be given the option of turning the delay estimation off if no delay is expected, or the user could set the maximum expected delay if prior information is available.

Band Pass Filter

As described above, the band pass filter(s) generated at step 434 in FIG. 4B may be used to perform one or multiple functions. First, the filter can be used to weight the input/output data in the frequency band of interest. It can therefore be used a pre-filter prior to modeling (such as is done when generating the hBP models). Second, the band pass filter can be used to aid in the generation of a meaningful prediction metric to help evaluate each of the potential models. Irrespective of the function, the form of the filter can be as follows:

$$L(s) = \frac{ks^2}{(\tau_l s + 1)^2 (\tau_h s + 1)^4} \quad (70)$$

where $\tau_l$ and $\tau_h$ are the low and high frequency breakpoints, respectively, and k is a normalizing gain element. The $\tau$ values may depend on the intended function and can be determined based on the available models.

Figure 13:
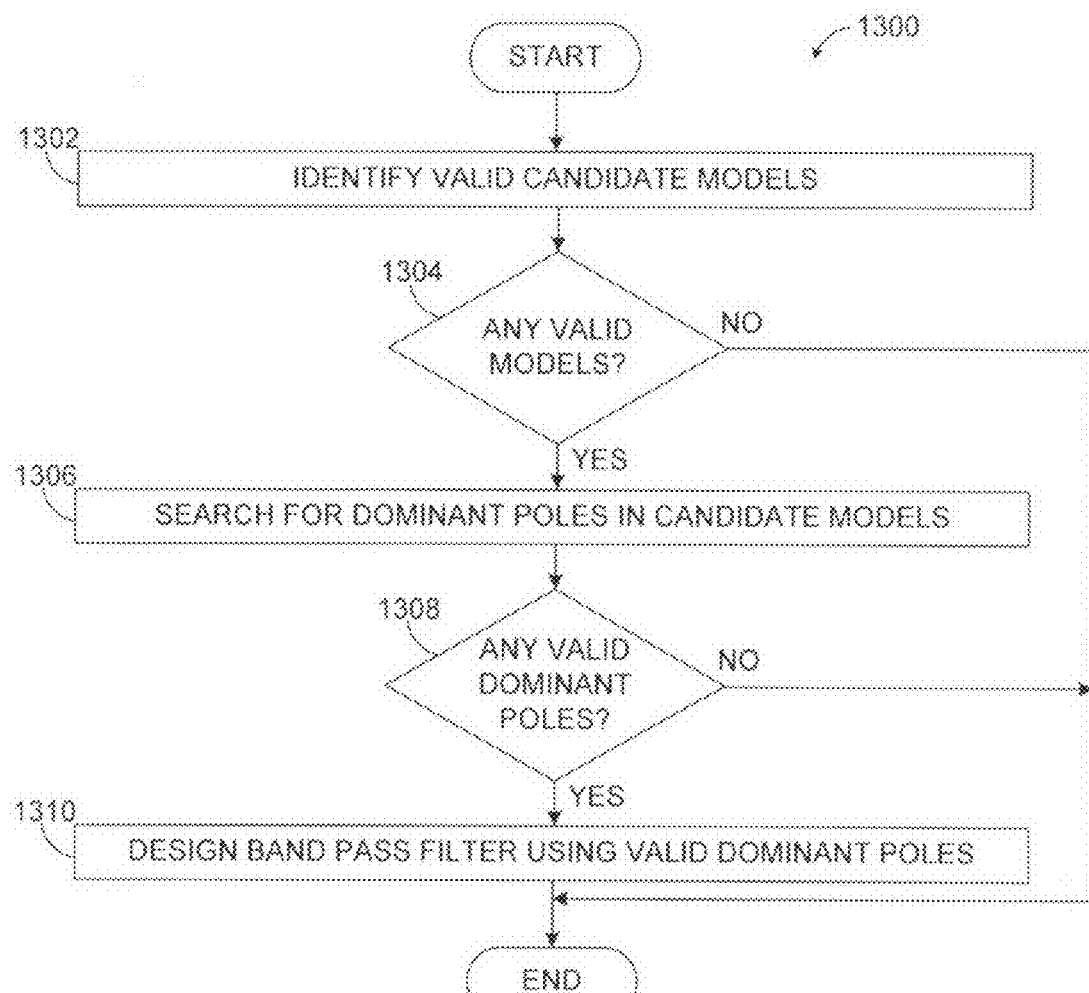

FIG. 13 illustrates an example method 1300 for designing a band pass filter. The method 1300 could be performed, for example, during step 434 in FIG. 4B. At the point where the band pass filter is designed in FIG. 4B, all but the hBP and tSP models may be available. Any valid model in the available candidate model sets is identified at step 1302. Additional details regarding model validation are provided below. Note that this step is optional and can be omitted if desired. If there are any valid models at step 1304, the valid candidate models are searched for one or more dominant poles at step 1306. If there are no valid models at step 1304 or if all dominant poles are outside of a predefined range (not valid) at step 1308, the method 1300 may end, and no band pass filter may be created. Otherwise, a band pass filter can be created using the valid dominant pole(s) at step 1310.

Figure 14:
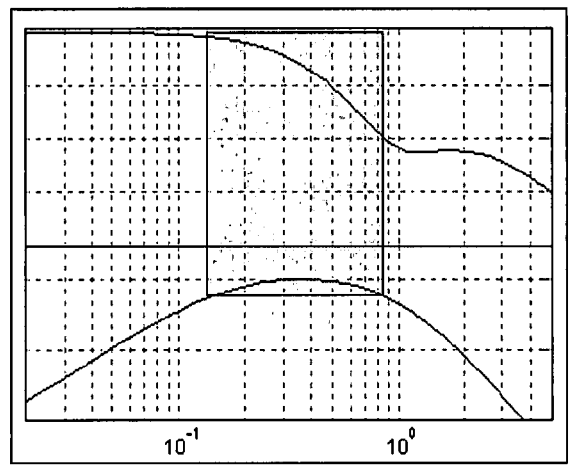

A bode plot of an example band pass filter designed in this way is shown in FIG. 14. In this particular example, high and low pass roll-off characteristics may be designed to pass all pertinent model information between approximately one and ten minutes. Noise can be rolled off at 40 db/decade, while drift can be rolled off at 20 db/decade.

The band pass filter can also be used to aid in defining a meaningful prediction metric. Once all models are identified, a prediction calculation can be performed to aid in model quality evaluation. This may involve evaluating $\hat{G}_i^j$ rather than $\hat{H}^j$. As such, non-stationary data can render prediction calculations useless. Direct use of $\hat{H}^j$ for prediction evaluation may be problematic for some applications. However, the filter defined by Equation (70) may be well suited for this task. The frequency bands in this case can be increased relative to the pre-filter case, as only predictions are involved and the attenuation of mid to low frequency disturbances is highly desirable.

Model Validation

As noted above, models may need to be validated before they are used in searching for the dominant poles of the band pass filter. From the user's perspective, the validation of a model may be the most important aspect of the entire identification procedure. Model validation may first be concerned with establishing if a causal relationship between input/output channels exists. If a relationship exists, the validation of a model may then focus on identifying the "quality" of the relationship. Defining "quality" can be an ambiguous heuristic task. In some embodiments, model validation by the model identification tool 132 may encompass only model metrics and may not impose automatic bounds on controller design. Both frequency and time domain based approaches could be used.

In particular embodiments, the model identification tool 132 supports a multi-staged, time-based approach to model validation. In this approach, models metrics are developed based not only on asymptotic theory but also on the fact that multiple models of varying structure and order exist. One example of this kind of approach is shown in FIG. 15.

Figure 15:
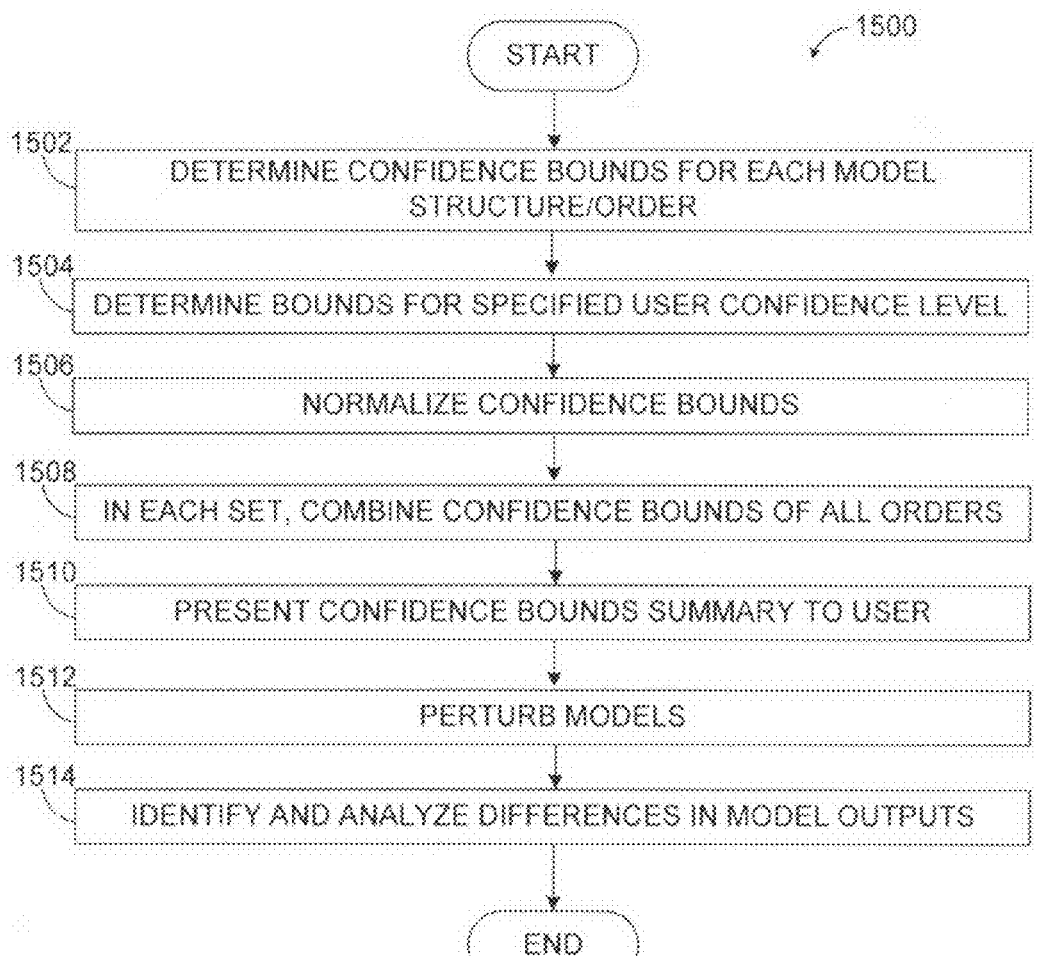

FIG. 15 illustrates an example method 1500 for model validation. In this approach, confidence bounds can be calculated for each model structure and for each model order at step 1502. This could include, for example, using the expressions given in Equations (34) through (38) for the distribution of the estimates in the time domain. These calculations can be performed for all model coefficients in $\hat{G}_i^j$ and $\hat{H}^j$ immediately after the estimates are available. Bounds are determined for any user-specified confidence level (the default value could be 95%) at step 1504, and the confidence bounds are normalized at step 1506. If the noise bound is defined as $\mathcal{N}_b^k \equiv t^* S(\hat{\theta}_k)$ (where $t^*$ is the probability limit and $S(\hat{\theta}_k)$ is the standard deviation of the $k^{th}$ estimate), the confidence bound of the $k^{th}$ estimate can be normalized as $(|\hat{\theta}_k|-N_b^k)/|\hat{\theta}_k|$. For each candidate model set, the confidence bounds for all orders in the set can be combined or aggregated at step 1508, and a confidence bound summary for an individual model structure can be presented to the user at step 1510.

Figure 16:
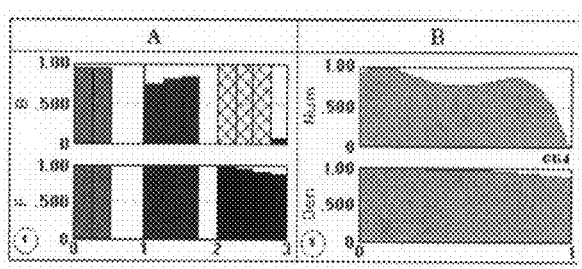

An example confidence bound summary is shown in FIG. 16. Confidence bounds are only presented for $\hat{G}_i^j$. The histograms in section A of FIG. 16 represent the raw values of the normalized confidence bounds for each of the B and F polynomial coefficients for the corresponding Box-Jenkins model. The order set for this case was $O^{iBJ}=\{2,3,4\}$. Any coefficient that passes the null hypothesis test is indistinguishable from noise and $|\hat{\theta}_k|-\mathcal{N}_b^k \leq 0$. As a result, these bounds are shown as the cross-hatched bars in section A of FIG. 16. In this example, the first three B coefficients in the $4^{th}$ order model are indistinguishable from noise. Vertical bar heights indicate the magnitude of the coefficients with respect to their noise bound on a scale from zero to one. As bounds information on individual coefficients may have little meaning, data for all confidence bounds can be combined, based on the average normalized values, into a single confidence bound metric as shown in the lower left corner of the plots in section A of FIG. 16. In this example, the metric is a value ranging from 1 (highest degree of confidence for the entire model set) to 5 (lowest degree of confidence).

Since individual coefficient information may have little practical value and many structures and orders are utilized, it may be convenient to present generic smoothed bound information such as that shown in section B of FIG. 16. This data is created by fitting a smoothing polynomial to all non-zero bars shown in the raw data plot in section A of FIG. 16. The "fill area" in this plot can be used to give a quick visual interpretation of confidence metrics for an entire model matrix.

Returning to FIG. 15, the model validation may also include perturbations of the models at step 1512. Since models of various structures and orders are available, it makes sense to use this information if possible. The basic premise of model perturbation is that, when a causal relationship between input/output channels exists, perturbations to a model may have little effect on the results if that model is accurate. Differences between the outputs of the models are identified and analyzed at step 1514. If all models are the same, there should be a relatively high confidence in the results. As the differences in the results increase, the confidence decreases. The same idea can be used here by automatically comparing results for multiple models for each input/output channel.

Figure 17:
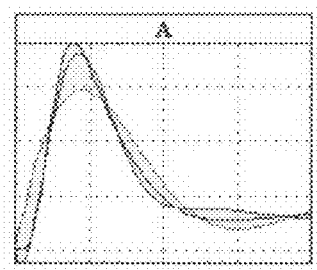
Figure 17:
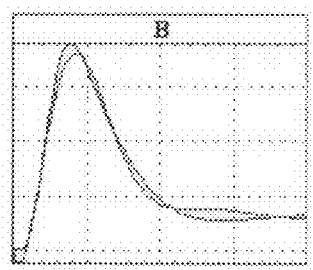
Figure 18:
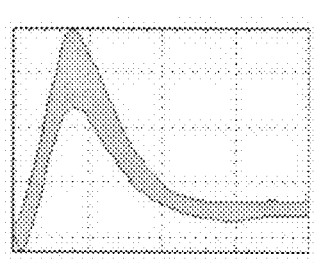

Example results for this type of comparison are shown in FIG. 17. In section A of FIG. 17, the response curves for all order sets for the iBJ model structure are superimposed one on top of the other, and the shaded area represents the envelope of responses for this structure. The shaded area represents an upper bound on the quality of the model in that the expected variation can be no less than that defined by the envelope, and the minimum variation is known for the data available. No lower bound is available, so the variation could be arbitrarily worse, and multiple metrics can be used.

The area ratio between this envelope and the normalized area of the plot box shown in section A of FIG. 17 is defined as the separation factor and can be assigned a numerical value between 1 (small separation) and 5 (large separation). The size of the separation envelope may be directly related to deleterious conditions such as under-modeling and any situations that lead to poor information content in the data.

To preclude over-penalizing cases where a single model is under-specified (which typically results in a large separation factor), an additional dispersion or sensitivity factor can be calculated for each model. Section B of FIG. 17 shows the dispersion envelope for these models. In this calculation, response curves for all order sets can be searched to find the two most self-similar responses. The dispersion metric for these curves may then be computed as described for the separation metric. The confidence information can be used to calculate an average gain amplification factor, which may be used to inflate the separation envelope. This results in a composite summary response envelope such as that shown in FIG. 18.

Prediction Metric

Once the models have been identified, prediction metrics can be determined for the models. Other quality metrics can be calculated immediately following the completion of each model set and may be based solely on the characteristics of the models. After all model sets are complete, the prediction metrics can be computed for the models. An example method for determining the prediction metrics is shown in FIG. 19.

Figure 19:
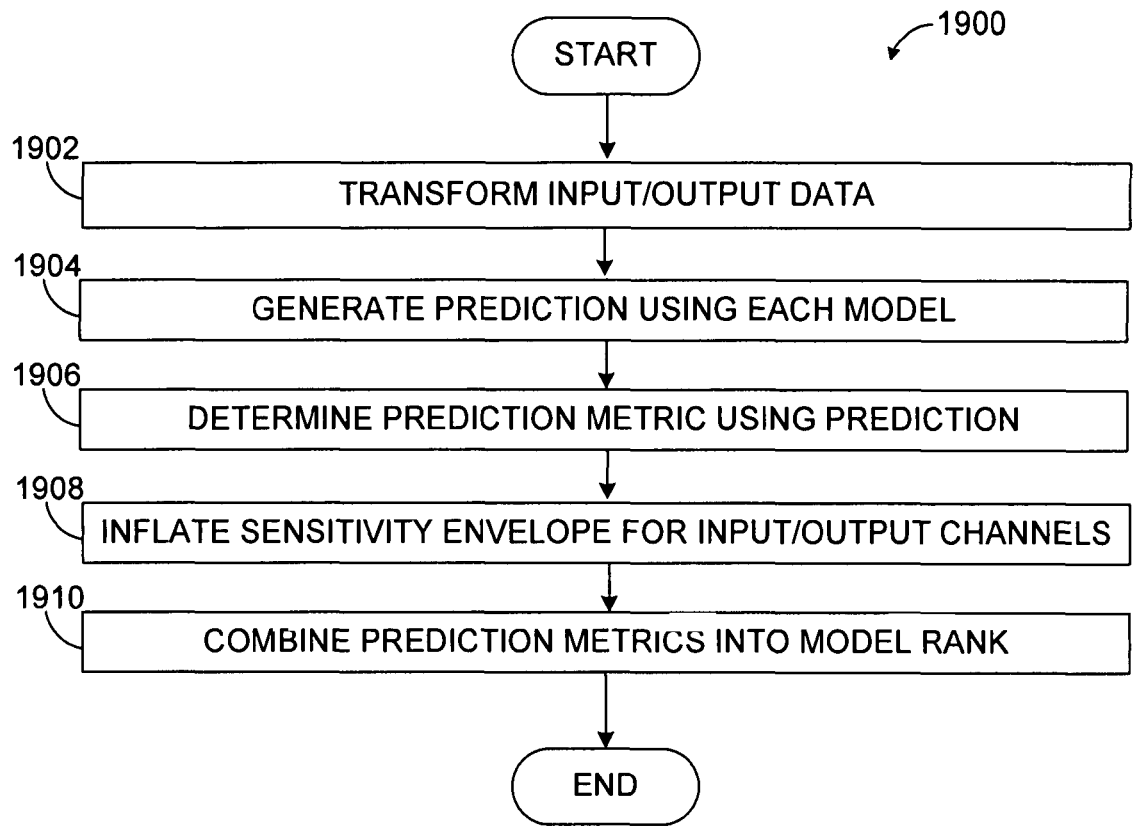

FIG. 19 illustrates an example method 1900 for determining prediction metrics for candidate models. In this example, the input/output data is transformed at step 1902. If the feedback effect due to disturbances is not too severe, the transformation can be performed using the band pass filter described above. To establish the severity of the feedback effect, the following correlation factor can be determined:

$$C_f^j = \max(u_i^c)$$

where:

$$u_i^c = \|\hat{u}_i^e\|/\|u_{i\|}\| \qquad (71)$$

The term $\hat{u}_i^e$ in Equation (71) may be given by Equation (64) when hPX is used and may be computed from Equation (65) based on the results of Equation (69) when tSP is used. When $C_f^j > K$, the band pass filter defined above may be replaced by the discrete filter $T(z) = \hat{A}^j(*)$, where $\hat{A}^j(*)$ is the highest order A polynomial corresponding to the hIX or hPX solution with the best model metrics.

Once the input/output data is filtered, each model is used to generate a prediction (such as an ∞—step ahead prediction $\hat{y}_f$) at step 1904. The prediction metric may then be determined at step 1906. The prediction metric could, for example, be defined by the following loss function:

$$L_p \equiv \frac{\sigma(y_f^* - \hat{y}_f)}{\sigma(y_f^*)}. \qquad (72)$$

Figure 20:
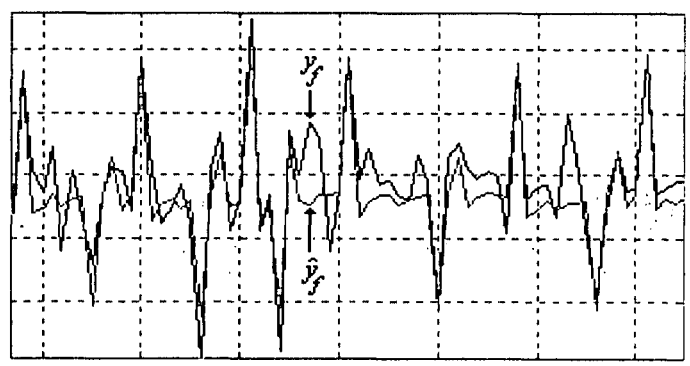

If the band pass filter is used, two different values of $y_f^*$ can be used to evaluate Equation (72). One uses the filtered y data directly ($y_f^* = y_f$), and the other uses a non-causal forward-backward filter such that $y_f^* = y_f^f$. A one-sample interval time constant may be implemented in the non-causal filter step to reduce high frequency noise (in case there is no band pass filter). When $C_f^j > k$, no additional filtering may need to be performed due to the high frequency weighting of $\hat{A}^j(*)$. An example of the prediction results for a high bandwidth test data set generated using trend removal and higher frequency weighting are illustrated in FIG. 20.

The filter $\hat{A}^j(*)$ may over-emphasize high frequency behavior, which could tend to over-inflate $L_p$. To attenuate this problem, only prediction data satisfying $\hat{y}^j(i) > \alpha \sigma(\hat{y}_f)$ may be included in the evaluation of Equation (72). While the band pass filter may perform well for mid to low bandwidth operation, it may yield unacceptable values for $L_p$ (reasonable models may have $0 \le L_p < 0.90$). Values greater than one may imply very poor performance. Hence, the metric based on the band pass filter could give the wrong result. Results with the $\hat{A}^j(*)$ filter, while more consistent than the band pass filter, may still tend to over-penalize the prediction metric for high bandwidth control. Less heuristic methods (for high bandwidth cases) can therefore be used in these cases. When $\hat{A}^j(*)$ is used, the separation model metric is not inflated and hence the model metrics are completely independent of any predictive quantity.

Returning to FIG. 19, when the prediction metrics for each model are complete, the sensitivity envelope for each input/output channel (such as that shown in FIG. 18) can be inflated (such as by a function of $L_p$) at step 1908. Consequently, the sensitivity metric can be updated, and individual metrics for each input/output channel may be combined into a summary metric defined as a model rank at step 1910. This rank could represent a weighted average of the individual metrics as shown below:

$$\mathcal{R} \equiv \frac{w_c \mathcal{R}_c + w_s \mathcal{R}_s + w_d \mathcal{R}_d}{\sum w} \qquad (73)$$

where $R_c$ is the rank metric corresponding to the model confidence bounds, $R_s$ is the rank metric corresponding to the separation envelope that includes inflation due to prediction errors, and $R_d$ is the rank metric corresponding to response dispersion. All ranks could have numerical values between one and five.

Figure 21:
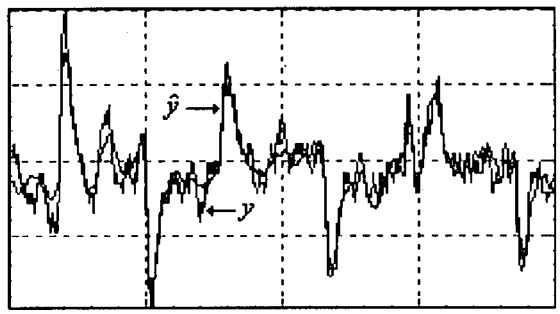

In this example, models with $R \ge 4$ could be considered invalid and not used for any control applications. For models where $R \le 3$, prediction quality can be expected to be good when the data is relatively stationary and disturbances are not too large. However, reliance on visual inspections (such as the visual inspection of the predictive performance corresponding to a valid model as shown in FIG. 21) can be problematic as even accurate models may exhibit poor visual performance under non-stationary conditions. By establishing a consistent model metric (the rank R) that is invariant to user interpretation, the model identification tool 132 may help to avoid this situation.

Search for Best Model

Once all model identification and metric calculations are complete, the model identification tool 132 may select from among the models available. In some embodiments, the model identification tool 132 may implement the technique shown in FIG. 22, which is intuitive, simple, and serves the needs for practical results.

Figure 22:
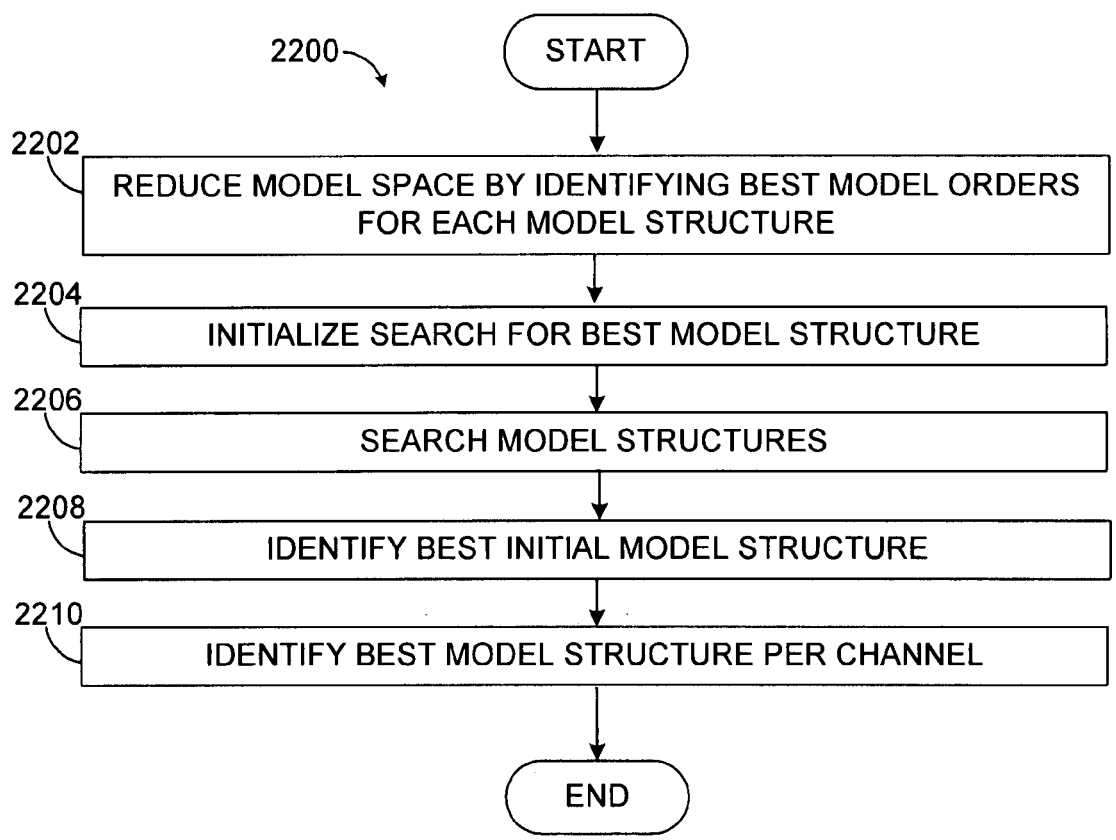

FIG. 22 illustrates an example method 2200 for searching for the best model within multiple candidate model sets. Prior to the formal search, the model space can be reduced by identifying the best model orders at step 2202. This could include, for example, finding the order set that results in the lowest loss function defined by Equation (72) for each model structure ($\mathcal{M}_k k = 1 \rightarrow 6$). This could be done for each output by finding the loss value for each order element ($O_s s = 1 \rightarrow 3$). In particular embodiments, this can be performed in multiple passes. In a first pass, all input channels can be assigned the same model orders. The model order resulting in the lowest loss function is then used as the starting value for a second pass. In the second pass, model orders can be varied independently for each input channel in a sequential fashion starting at the first input and ending at the last. The result is a set of "best" orders for each model structure (the "best" set is not necessarily optimal as an exhaustive search has not been performed).

With the best model order determined, all that remains is the determination of the best model structure. The search for the best model structure may be similar to that described above for the model order, except here both the prediction loss defined by Equation (72) and the model rank defined by Equation (73) can be used in the overall search procedure. Initialization of the final search occurs at step 2204, which could include selecting an initial model that is viewed currently as the best model. This initialization can be based, at least in part, on prior knowledge of historical model performance in previous applications. For example, the hIX and hPX structures may have previously proven to be the most reliable model forms on past step test data. As such, the initialization of the final search (the initial selection of the best model structure) may start preferentially with one of these model structures, such as the hIX model.

All other structures can then be searched at step 2206, and the best initial model structure is identified at step 2208. For example, each model structure can be selected in turn and compared to the current best model structure. The selected model structure could take the place of the current best model structure if certain criteria are met. For example, the selected model structure could replace the current best model structure if any of the following three criteria are met:

(1) The loss function for the selected model structure is less than the loss function of the current best model structure by a specified tolerance, and the average model rank for the selected model structure is not less than the average model rank of the current best model structure;

(2) All individual model ranks for the selected model structure are better than the model ranks of the current best model structure, and the loss function for the selected model structure is not worse than the loss function of the current best model structure by a specified tolerance; or (3) All non-null model ranks for the selected model structure are $R \leq 2$, and the current best model structure has at least one $R \geq 3$.

Once all model structures are searched, the current best model is selected as the initial model.

Once the initialization is complete, the search proceeds by evaluating all model structures in a sequential fashion for each input channel at step 2210. This could include, for example, starting at the first input and going to the last. The "best" sub-model (the model for an input/output channel) is updated if either of the following criteria are met:

(1) A selected model's rank is less than or equal to the current model's rank, and the selected model's loss function is less than the current model's loss function by a specified tolerance; or (2) The selected model's rank is less than the current model's rank, and the selected model's loss function is not worse than the current model's loss function by a specified tolerance.

Upon completion of the search, there may exist a single selected model for each input/output channel. The structure of each model can be different and can be of arbitrarily high order.

Order Reduction

An order reduction technique can be used to determine the order of the final model. In some techniques (such as subspace/state-space methods), order reduction is not an explicit operation since the state order is determined as an integral part of the identification procedure. Many different order estimation techniques are available, many of which are based on some form of singular value thresholding, AIC methods, or some combination thereof. Accurate order estimation is generally not as easy as it may first seem. This may be primarily due to the distribution of singular values found in actual practice. If the order is estimated accurately, these techniques can result in a truly minimal order system. If not, however, deleterious bias effects can be introduced at the fundamental data regression level.

Model identification approaches, such as the one discussed above, may not be immune to the need for order reduction. Here, however, the reduction can be performed in a controlled secondary explicit step after the formal model identification procedure.

Figure 23:
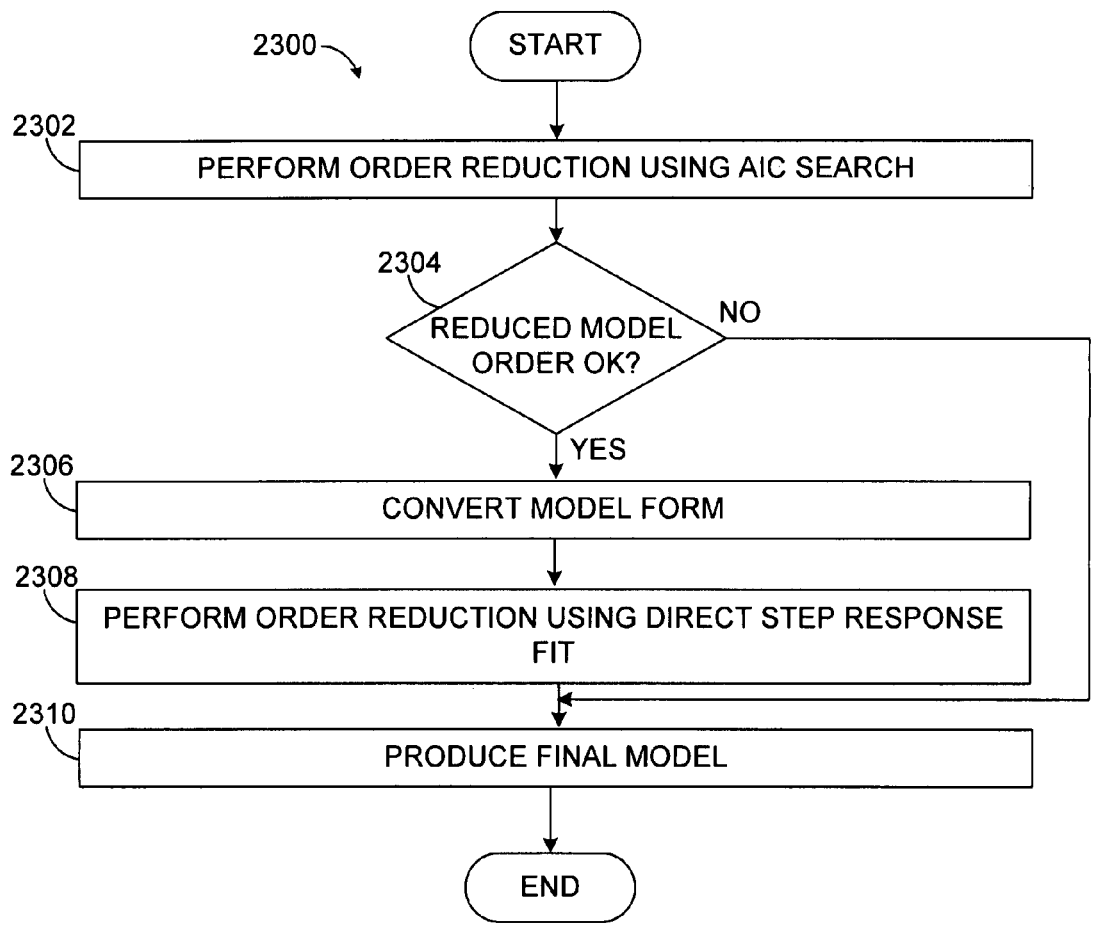

FIG. 23 illustrates an example method 2300 for model order reduction. The method 2300 could represent a process that involves two passes through a model. In the initial pass, the goal of the model identification tool 132 is to have a model set flexible enough such that $G_0 \in M$ (it captures the actual process), which may be a requirement for unbiased models. This can often lead to over-parameterized models and increased variance. To the extent possible, this variance can be reduced by order reduction.

In spite of the order reduction, the resultant model matrix may not necessarily have a minimal order. For some controller applications (such as MPC), this may be of no concern. For state-space based controller designs, a state-space realization may be required once the final model matrix has been determined. Glover's balanced realization approach can be modified for this purpose. Accuracy of the minimal order system designed in this fashion can be checked at all relevant frequencies as the original model is available. This is decidedly different than trying to identify a minimal order model directly from data.

Since discrete time multivariable models exist at this stage, model order reduction can be performed in a controlled fashion using SISO models. For example, model order reduction could be accomplished in two steps, with one pass based on an AIC search (step 2302) and a subsequent pass based on a direct step response fit (step 2308).

In the first pass of the model order reduction process at step 2302, order reduction can be accomplished via SISO simulation. For example, an IPE model can be fit to simulation data generated by the original discrete time model and an internally formulated pseudorandom binary signal (PRBS). Three possible delays may be available during the first phase of the reduction step: the estimated delay for the high-order model, the estimated delay for the reduced order model, and the estimated non-minimum phase time from the existing step response model. Each of these delays can be used in the AIC search for model order. The order/delay with the minimum loss function can be selected as the solution in the first phase.

As part of this first phase, the reduced order model can be analyzed to ensure it is acceptable at step 2304. For example, checks can be made to ensure faithful representation so that the reduced order model is within a prescribed tolerance of the original model in terms of gain and response time. Any reduced discrete time model may then be converted into continuous LaPlace domain form or other suitable form at step 2306. For instance, factorization can be performed to ensure that integrating models have one pole exactly at the origin. If there is a failure at any point, the individual model is not reduced.

Figure 24:
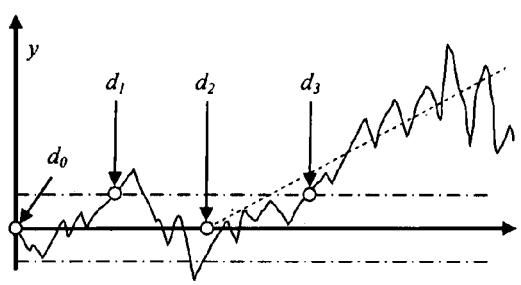

During the second pass of the model order reduction process at step 2308, the original step response of the model is fit, such as by using a fixed structure LaPlace and a free structure pre-filtered ARX model in conjunction with the tentative delay targets. An example of this is shown in FIG. 24. In this example, the target delays are as follows:

(1) $d_0$—this may always correspond to the zero delay solution;

(2) $d_1$—this may be determined by starting at the beginning of the step response curve and finding the time when the step response first exceeds the noise threshold (the dashed line in FIG. 24);

(3) $d_2$—this may correspond to the delay that would be obtained if a first order plus dead time model were to be fit to the step response curve; and (4) $d_3$—this may be determined by starting at the end of the step response curve and working backward in time. The delay can be given by the first time the step response breaks the noise threshold. This value can be considered to be the minimum-phase time (delay plus any inverse response time) of the process.

These delay targets can be used for both the LaPlace and ARX models, which may have the following respective forms. The LaPlace model may have the form:

$$T(s) = \frac{k(\tau_3 s + 1)}{s(\tau_1 s + 1)(\tau_2 s + 1)} e^{-ds} \qquad (74)$$

where k is the process gain, $\tau_1$ is the time constant associated with the dominant process pole, $\tau_2$ is the time constant associated with the secondary process pole, and $\tau_3$ is the time constant associated with the process zero.
The ARX model may have the form:

$$T(z) = L(z^{-f}) \frac{b_1 z^{-1} + b_2 z^{-2} \ldots + b_n z^{-n}}{1 + a_1 z^{-1} + a_2 z^{-2} \ldots + a_n z^{-n}} z^{-d}. \qquad (75)$$

In the solution of Equation (74), the leading s term in the denominator can be included for integrating sub-processes, and the search may determine if there is a need for $\tau_2$ and/or $\tau_3$. In the solution of Equation (75), both the order n of the model and the order f of the filter can be determined simultaneously. The filter order can be determined as the maximum value for f that renders a model within a prescribed tolerance of the original model (in terms of gain and response time) and is stable. If no filter is found, the method may fail.

The first and second passes of the model order reduction process may produce results that can be used to establish the final reduced order model at step 2310. For example, the model with the lowest order that satisfies the accuracy tolerance can be chosen. If no model is found that satisfies the accuracy tolerance, the order of the selected model could not be effectively reduced. If a model has been successfully reduced, the confidence bounds for the new model can be generated and the model metrics can be updated.

The identification technique described above for identifying and selecting a model of a process to be controlled may be integrated with an effective signal design procedure. Aspects of this integration can include avoiding problems with potential constraint violations and issues induced by control optimizers forcing a reduced operational space. Information exchange between identification and signal design may allow for online updating of a signal based on the current state of a model. This integration could be run completely online or performed on an off-line device (during desktop analysis, such as by using standard OPC connections). A tighter coupling between identification and controller tuning based on model metrics or uncertainty could also be supported.

In particular embodiments, the model identification tool 132 could be used in conjunction with a closed-loop step tester. The step tester could communicate with a controller directly and excite any measured variable or combination of measured variables. The controller could take the excitation signal, check for any limit violations, and send the excitation signal out (assuming there are no violations). The controller may then continue optimizing and controlling a process during step testing.

Although FIGS. 5 through 24 illustrate examples of the operations during automated identification of an industrial process in a process control system, various changes could be made to FIGS. 5 through 24. For example, while some of these figures illustrate example ways in which certain operations can be implemented, these operations could be implemented in any other suitable manner. Also, while some of these figures illustrate example results obtained using particular data and operations, these are examples for illustration and explanation only and are not limiting to the described devices and methods.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:
1. A method comprising:
identifying multiple model structure-model order combinations, the model structure-model order combinations associated with a process to be controlled;
designing a band pass filter using at least one of the identified model structure-model order combinations;
identifying at least one additional model structure-model order combination using the band pass filter;

determining one or more metrics for each of the model structure-model order combinations;

selecting at least one of the model structure-model order combinations based on the one or more metrics; and providing a model for controlling the process, the model based on the at least one selected model structure-model order combination.

2. The method of claim 1, wherein identifying the multiple model structure-model order combinations comprises performing both open-loop and closed-loop identification.

3. The method of claim 1, wherein identifying the multiple model structure-model order combinations comprises:

generating multiple model sets, each model set comprising multiple models associated with a single model structure and having different model orders.

4. The method of claim 1, further comprising:

estimating a time delay associated with the model prior to identifying the model structure-model order combinations.

5. The method of claim 1, further comprising:

reducing an order of the model prior to providing the model for controlling the process.

6. The method of claim 1, further comprising:

reducing an order of one or more of the model structure-model order combinations prior to selecting the at least one model structure-model order combination.

7. The method of claim 1, wherein:

identifying the multiple model structure-model order combinations comprises identifying a high-order auto-regressive with integrated exogenous inputs (hIX) candidate model set, an intermediate Box-Jenkins (iBJ) candidate model set, a low-order output error (lPE) candidate model set, and a high-order pre-filtered auto-regressive with exogeneous inputs (hPX) candidate model set; and identifying the at least one additional model structure-model order combination comprises identifying a high-order, band pass filtered, auto-regressive with exogeneous inputs (hBP) candidate model set.

8. The method of claim 7, wherein validating the at least one model structure-model order combination used to design the band pass filter comprises:

perturbing the model structure-model order combinations;

examining outputs of the perturbed model structure-model order combinations; and for each model structure, identifying a value of a separation envelope based on differences in the outputs of the model structure-model order combinations for that model structure.

9. The method of claim 8, wherein validating the at least one model structure-model order combination further comprises:

calculating an average gain amplification factor; and inflating the separation envelopes using the average gain amplification factor.

10. The method of claim 1, further comprising:

validating the at least one model structure-model order combination used to design the band pass filter.

11. The method of claim 1, wherein at least one of the one or more metrics is determined using the band pass filter.

12. The method of claim 1, wherein determining the one or more metrics comprises determining a prediction metric for each of the model structure-model order combinations.

13. The method of claim 12, wherein selecting the at least one model structure-model order combination comprises selecting the at least one model structure-model order combination based on the prediction metric and a rank associated with each of the model structure-model order combinations.

14. The method of claim 1, wherein providing the model for controlling the process comprises:

converting the at least one selected model structure-model order combination into a continuous time domain; and outputting the at least one converted model structure-model order combination in transfer function form.

15. The method of claim 1, wherein:

the multiple model structure-model order combinations are identified using pre-filtered data; and the at least one additional model structure-model order combination is identified using filtered data, the filtered data comprising the pre-filtered data as modified by the band pass filter.

16. The method of claim 1, further comprising:

defining at least one of the one or more metrics using the band pass filter.

17. The method of claim 1, wherein designing the band pass filter comprises:

identifying at least one dominant pole in at least one of the multiple model structure-model order combinations; and creating the band pass filter using the at least one dominant pole.

18. An apparatus comprising:

at least one memory operable to store multiple model structure-model order combinations associated with a process to be controlled; and at least one processor operable to:

identify some of the model structure-model order combinations;

design a band pass filter using at least one of the identified model structure-model order combinations;

identify at least one other of the model structure-model order combinations using the band pass filter;

determine one or more metrics for each of the model structure-model order combinations;

select at least one of the model structure-model order combinations based on the one or more metrics; and provide a model for controlling the process, the model based on the at least one selected model structure-model order combination.

19. The apparatus of claim 18, wherein the at least one processor is operable to identify some of the model structure-model order combinations by:

generating multiple model sets, each model set comprising multiple models associated with a single model structure and having different model orders.

20. The apparatus of claim 18, wherein the at least one processor is further operable to estimate a time delay associated with the model prior to identifying the model structure-model order combinations.

21. The apparatus of claim 18, wherein the at least one processor is further operable to:

reduce an order of one or more of the model structure-model order combinations prior to selecting the at least one model structure-model order combination; and reduce an order of the model prior to providing the model for controlling the process.

22. The apparatus of claim 18, wherein the at least one processor is operable to determine at least one of the one or more metrics using the band pass filter.

23. The apparatus of claim 18, wherein the at least one processor is operable to determine the one or more metrics by determining a prediction metric for each of the model structure-model order combinations.

24. The apparatus of claim 23, wherein the at least one processor is operable to select the at least one model structure-model order combination based on the prediction metric and a rank associated with each of the model structure-model order combinations.

25. A non-transitory computer readable medium embodying a computer program, the computer program comprising computer readable program code for:

identifying multiple model structure-model order combinations associated with a process to be controlled;

designing a band pass filter using at least one of the identified model structure-model order combinations;

identifying at least one additional model structure-model order combination using the band pass filter;

determining one or more metrics for each of the model structure-model order combinations;

selecting at least one of the model structure-model order combinations based on the one or more metrics; and providing a model for controlling the process, the model based on the at least one selected model structure-model order combination.

26. The computer readable medium of claim 25, wherein the computer readable program code for determining the one or more metrics comprises computer readable program code for determining at least one of the one or more metrics using the band pass filter.

* * * * *